(12) United States Patent
Zhong et al.

(10) Patent No.: US 12,147,088 B2
(45) Date of Patent: Nov. 19, 2024

(54) CAMERA LENS GROUP

(71) Applicant: ZHEJIANG SUNNY OPTICS CO., LTD., Zhejiang (CN)

(72) Inventors: Xusen Zhong, Zhejiang (CN); Saifeng Lyu, Zhejiang (CN); Fujian Dai, Zhejiang (CN); Liefeng Zhao, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 584 days.

(21) Appl. No.: 17/419,310

(22) PCT Filed: Sep. 3, 2019

(86) PCT No.: PCT/CN2019/104178
§ 371 (c)(1),
(2) Date: Jun. 29, 2021

(87) PCT Pub. No.: WO2020/168705
PCT Pub. Date: Aug. 27, 2020

(65) Prior Publication Data
US 2022/0091369 A1 Mar. 24, 2022

(30) Foreign Application Priority Data
Feb. 19, 2019 (CN) .......................... 201910124287.1

(51) Int. Cl.
G02B 9/60 (2006.01)
G02B 13/00 (2006.01)
G02B 13/06 (2006.01)

(52) U.S. Cl.
CPC ........... G02B 9/60 (2013.01); G02B 13/0045 (2013.01); G02B 13/06 (2013.01)

(58) Field of Classification Search
CPC ........ G02B 13/0045; G02B 9/64; G02B 9/62; G02B 9/60
See application file for complete search history.

(56) References Cited

U.S. PATENT DOCUMENTS

2014/0098239 A1* 4/2014 Jeong ..................... G02B 5/208
359/357
2014/0268369 A1 9/2014 Chen et al.
(Continued)

FOREIGN PATENT DOCUMENTS

CN 105572847 A 5/2016
CN 108398771 A 8/2018
(Continued)

OTHER PUBLICATIONS

CN priority application first search report issued on Apr. 2, 2024.

Primary Examiner — Sharrief I Broome
Assistant Examiner — Journey F Sumlar
(74) Attorney, Agent, or Firm — Samson G. Yu

(57) ABSTRACT

The disclosure provides a camera lens group, sequentially including, from an object side to an image side along an optical axis: a first lens with a refractive power, a second lens with a negative refractive power and an image-side surface thereof being concave, a third lens with a positive refractive power, a fourth lens with a positive refractive power and an image-side surface thereof being convex, and a fifth lens with a negative refractive power, wherein an air space is provided between any two adjacent lenses from the first lens to the fifth lens, and at least one lens from the first lens to the fifth lens is provided with an aspheric surface which is in non-rotational symmetry. An effective focal length fx, in an X-axis direction and an effective focal length fy, in a Y-axis direction, of the camera lens group satisfy $0.90 < fx/fy < 1.25$.

20 Claims, 7 Drawing Sheets

(56) References Cited

U.S. PATENT DOCUMENTS

2014/0300973 A1\* 10/2014 Neil ................ G02B 13/08
                                                  359/671
2016/0161706 A1\*  6/2016 Liao ............. G02B 13/0045
                                                  359/740
2017/0299846 A1\* 10/2017 Lin ............. G02B 27/0025
2017/0371133 A1\* 12/2017 Lai ................ G02B 13/006

FOREIGN PATENT DOCUMENTS

| CN | 108693631 A | 10/2018 |
| CN | 109270661 A | 1/2019 |
| CN | 109613685 A | 4/2019 |
| CN | 209514191 U | 10/2019 |
| JP | 2016095542 A | 5/2016 |
| JP | 2017068164 A | 4/2017 |

\* cited by examiner

CAMERA LENS GROUP

CROSS-REFERENCE TO RELATED PRESENT INVENTION(S)

The disclosure claims priority to and the benefit of Chinese Patent Present invention No. 201910124287.1, filed in the China National Intellectual Property Administration (CNIPA) on 19 Feb. 2019, which is incorporated herein by reference in its entirety.

TECHNICAL FIELD

The disclosure relates to camera lens groups, in particular to a camera lens group including five lenses and having a free-form surface.

BACKGROUND

In recent years, as portable electronic products have been rapidly developing, and image sensors, for example, complementary metal oxide semiconductors (CMOS) and charge coupled devices (CCD) tend to develop towards the larger total number of pixels and the smaller pixel size, which raise increasingly higher requirements on matched camera lenses. Part of portable electronic products require a camera lens to have a large field of view so as to shoot a wider scene, for example, an ultra-wide-angle lens of which the field of view can reach 150° or above and which can achieve clear imaging.

However, a smaller size, a larger field of view and better imaging quality are required while the amount of light passing through the lens is increased, and these conditions are generally contradictory, resulting in an increase in the difficulty of lens design. In addition, a wide-angle lens generally has a defect of large aberration, particularly too large distortion, and is not beneficial to satisfaction of the requirement for clear imaging.

SUMMARY

Some embodiments of the disclosure provide a camera lens group which is suitable for a portable electronic product and may at least solve or partially solve at least one defect in the prior art.

Provided in the disclosure is a camera lens group, which may sequentially include, from an object side to an image side along an optical axis: a first lens with a refractive power, a second lens with a negative refractive power and an image-side surface thereof being concave, a third lens with a positive refractive power, a fourth lens with a positive refractive power and an image-side surface thereof being convex, and a fifth lens with a negative refractive power, wherein at least one lens from the first lens to the fifth lens may be provided with an aspheric surface which is in non-rotational symmetry.

In one embodiment, an air space may be provided between any two adjacent lenses from the first lens to the fifth lens.

In one embodiment, an effective focal length fx, in an X-axis direction, of the camera lens group and an effective focal length fy, in a Y-axis direction, of the camera lens group may satisfy $0.90<fx/fy<1.25$.

In one embodiment, Semi-FOV is a half of a maximum field of view of the camera lens group, Semi-FOV may satisfy Semi-FOV>83.5°.

In one embodiment, a curvature radius R1 of an object-side surface of the first lens and a curvature radius R2 of an image-side surface of the first lens may satisfy $0.50<R1/R2<1.50$.

In one embodiment, a spacing distance T23, on the optical axis, between the second lens and the third lens and a spacing distance T34, on the optical axis, between the third lens and the fourth lens may satisfy $1.50<T23/T34<3.00$.

In one embodiment, a curvature radius R7 of an object-side surface of the fourth lens and a curvature radius R10 of an image-side surface of the fifth lens may satisfy $1.00<R7/R10<3.60$.

In one embodiment, a center thickness CT3, on the optical axis, of the third lens and a distance TTL, on the optical axis, from an object-side surface of the first lens to an imaging surface of the camera lens group may satisfy $1.50<CT3*10/TTL<2.00$.

In one embodiment, an on-axis distance SAG41 from an intersection point of an object-side surface of the fourth lens and the optical axis to an effective radius vertex of the object-side surface of the fourth lens and an on-axis distance SAG42 from an intersection point of an image-side surface of the fourth lens and the optical axis to an effective radius vertex of the image-side surface of the fourth lens may satisfy $-13.50<SAG41*100/SAG42<-6.50$.

In one embodiment, an effective focal length f3 of the third lens and an effective focal length f4 of the fourth lens may satisfy $1.50<f3/f4<2.50$.

In one embodiment, ImgH is a half of a diagonal length of an effective pixel region on the imaging surface of the camera lens group, a spacing distance T45, on the optical axis, between the fourth lens and the fifth lens and ImgH may satisfy $2.00<T45*100/ImgH<4.50$.

In one embodiment, a curvature radius R7 of an object-side surface of the fourth lens and an effective focal length f4 of the fourth lens may satisfy $2.00<R7/f4<4.00$.

In one embodiment, a center thickness CT3, on the optical axis, of the third lens and a spacing distance T34, on the optical axis, between the third lens and the fourth lens may satisfy $2.00<CT3/T34<3.50$.

In one embodiment, a center thickness CT1, on the optical axis, of the first lens and a center thickness CT2, on the optical axis, of the second lens may satisfy $1.00<CT1/CT2<2.00$.

In one embodiment, ImgH is a half of a diagonal length of an effective pixel region on the imaging surface of the camera lens group, the distance TTL, on the optical axis, from the object-side surface of the first lens to the imaging surface of the camera lens group and ImgH may satisfy $3.50<TTL/ImgH<4.20$.

In one embodiment, the sum ΣAT of spacing distances, on the optical axis, between any two adjacent lenses from the first lens to the fifth lens and a distance TD, on the optical axis, from the object-side surface of the first lens to the image-side surface of the fifth lens satisfy $\Sigma AT/TD<0.42$.

The disclosure adopts a plurality of (for example, five) lenses, the refractive power and a surface type of each lens, the center thickness of each lens, the on-axis distance between the lenses, etc. are reasonably distributed, and accordingly, the camera lens group has at least one beneficial effects of miniaturization, ultra-wide angle, high imaging quality, etc. Besides, by introducing the aspheric surface which is in non-rotational symmetry, an off-axis meridian aberration and a sagittal aberration of the camera lens group are corrected simultaneously, thereby further improving the imaging image quality.

BRIEF DESCRIPTION OF THE DRAWINGS

Other features, objectives, and advantages of the disclosure will become more apparent by means of the detailed description on non-limiting embodiments, in conjunction with the accompanying drawings. In the drawings.

DETAILED DESCRIPTION OF THE EMBODIMENTS

Figure 1:
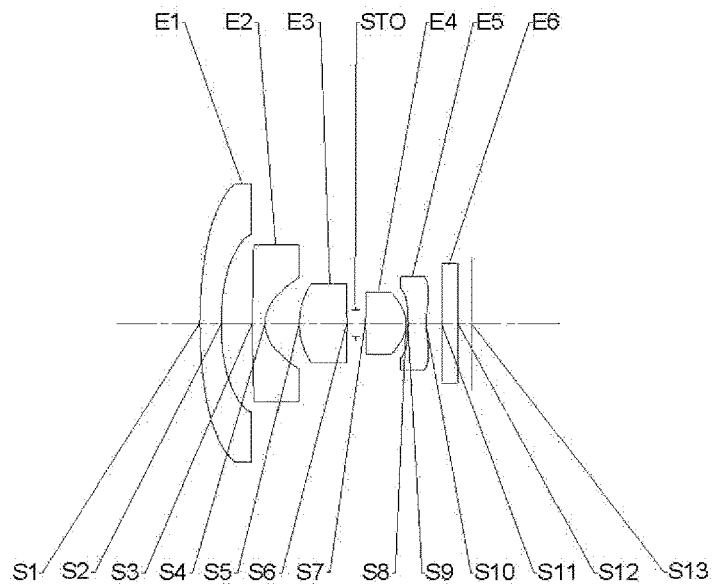
FIG. 1 shows a structural schematic diagram of a camera lens group according to embodiment 1 of the disclosure.

For a better understanding of the present application, various aspects of the present application will be described in greater detail with reference to the accompanying drawings. It should be understood that these detailed descriptions are merely descriptive of exemplary embodiments of the present application and are not intended to limit the scope of the present application in any way. Same reference numerals refer to same elements throughout the specification. The expression "and/or" includes one or more of any and all combinations of associated listed items.

It should be noted that throughout this specification, the recitations of first, second, third, etc. are used merely to distinguish one feature from another and do not represent any limitation on the feature. Thus, the first lens discussed below may also be referred to as the second lens or the third lens without departing from the teachings of the present application.

In the accompanying drawings, the thickness, size, and shape of the lens have been slightly exaggerated for ease of illustration. Specifically, a spherical or aspheric shape, shown in the accompanying drawings, is illustrated by way of example. That is to say that the spherical or aspheric shape is not limited to the spherical or aspheric shape shown in the accompanying drawings. The drawings are examples only and are not drawn to scale strictly.

A paraxial region refers herein to a region near an optical axis. If a surface of a lens is a convex surface and a position of the convex surface is not defined, the surface of the lens is a convex surface at least in the paraxial region; and if the surface of the lens is a concave surface and the position of the concave surface is not defined, the surface of the lens is a concave surface at least in the paraxial region. A surface, closest to a photographed object, of each lens is called the object-side surface of the lens, and a surface, closest to an imaging surface, of each lens is called the image-side surface of the lens.

Herein, a direction parallel to the optical axis is defined as the Z-axis direction, a direction perpendicular to the Z-axis and lying in a meridian plane is defined as the Y-axis direction, and a direction perpendicular to the Z-axis and lying in a sagittal plane is defined as the X-axis direction. Unless otherwise indicated, all parametric symbols (for example, curvature radius, etc.) herein, other than the parametric symbol relating to the field of view, represent characteristic parametric values along the Y-axis direction of the camera lens group. For example, without particular description, a conditional expression "R1/R2" denotes the ratio of a curvature radius R1y, in the Y-axis direction, of the object-side surface of the first lens to a curvature radius R2y, in the Y-axis direction, of the image-side surface of the first lens.

It should also be understood that the terms "comprises," "comprising," "has," "includes," and/or "including," when used in this specification, indicate the presence of stated features, elements, and/or components, but do not preclude the presence or addition of one or more other features, elements, components, and/or combinations thereof. Further, when a statement such as "at least one of . . . " appears after a list of listed features, the entire listed feature is modified, rather than modifying an individual element in the list. Further, when describing embodiments of the present application, the use of "may" means "one or more embodiments of the present application". In addition, the term "exemplary" is intended to refer to an example, or illustration.

All terms (including technical and scientific terms) used herein have the same meaning as commonly understood by those of ordinary skill in the art to which this application belongs unless otherwise defined. It should also be understood that terms (for example, terms defined in commonly used dictionaries) should be interpreted as having a meaning that is consistent with their meaning in the context of the relevant art and will not be interpreted in an idealized or overly formal sense unless expressly so defined herein.

It should be noted that the embodiments of the present application and the features of the embodiments may be combined with each other without conflict. The present application will be described in detail below with reference to the accompanying drawings in conjunction with embodiments.

The features, principles, and other aspects of the present application are described in detail below.

The camera lens group according to the exemplary embodiment of the disclosure may include five lenses having refractive power, which are a first lens, a second lens, a third lens, a fourth lens, and a fifth lens. The five lenses are sequentially arranged along an optical axis from an object side to an image side, and an air space is provided between any two adjacent lenses.

In the exemplary embodiment, the first lens has a positive refractive power or a negative refractive power; the second lens may have a negative refractive power, and its image-side surface may be concave; the third lens may have a positive refractive power; the fourth lens may have a positive refractive power, and its image-side surface may be convex; and the fifth lens may have a negative refractive power. With rational configuration of the refractive power of a lens system, the off-axis aberration of the camera lens group may be corrected, thereby improving the imaging quality.

In the exemplary embodiment, the image quality may be further improved by setting an object-side surface and/or an image-side surface of at least one lens from the first lens to the fifth lens as an aspheric surface which is in non-rotational symmetry. The aspheric surface which is in non-rotational symmetry is a free-form surface, on the basis of the aspheric surface which is in rotational symmetry, the non-rotational symmetry component is added, and then the aspheric surface which is in non-rotational symmetry is introduced into the lens system, which facilitates effective correction of off-axis meridian aberration and sagittal aberration, thereby greatly improving the performance of an optical system. The camera lens group according to the disclosure may include at least one aspheric surface which is in non-rotational symmetry, for example, one aspheric surface which is in non-rotational symmetry, two aspheric surfaces which are in non-rotational symmetry, or more aspheric surfaces which are in non-rotational symmetry.

In the following examples, the image-side surface of the fifth lens in embodiment 1, the object-side surface and the image-side surface of the third lens in embodiment 2, the object-side surface of the second lens and the image-side surface of the fourth lens in embodiment 3, the object-side surface of the third lens and the image-side surface of the fourth lens in embodiment 4, the image-side surface of the fourth lens and the object-side surface of the fifth lens in embodiment 5, the image-side surface of the fourth lens in embodiment 6 and the object-side surface of the fourth lens in embodiment 7 are all aspheric surfaces which are in non-rotational symmetry, that is, free-form surfaces.

In an exemplary embodiment, the object-side surface of the first lens may be convex, and the image-side surface thereof may be concave; the object-side surface of the third lens may be convex; and the object-side surface of the fourth lens may be convex, and the image-side surface of the fifth lens may be concave.

In an exemplary embodiment, the camera lens group of the disclosure may satisfy a conditional expression 0.90<fx/fy<1.25, wherein fx is an effective focal length, in the X-axis direction, of the camera lens group and fy is an effective focal length, in the Y-axis direction, of the camera lens group. More specifically, fx and fy may further satisfy 1.00≤fx/fy≤1.20. Focal length ratios in the X-axis direction and the Y-axis direction are reasonably configured, thereby favorably improving the degree of freedom of the free-form surface in two directions, and optimizing a correction effect of the camera lens group on off-axis aberration; and meanwhile, the aberration and various parameters of the camera lens group may be controlled in a proper range, thereby improving the imaging quality of the lens set.

In an exemplary embodiment, the camera lens group of the disclosure may satisfy a conditional expression Semi-FOV>83.5°, wherein Semi-FOV is half of a maximum field of view of the camera lens group. More specifically, the Semi-FOV may further satisfy 84.0°≤Semi-FOV≤86.5°. The Semi-FOV is controlled to be 83.5° or above, and accordingly, the camera lens group may cover a wide range of scenery in actual photographing, thereby effectively showing a wide atmosphere of a large scene. Moreover, compared with a conventional lens with a small field of view, the lens may better emphasize the foreground and highlight the distance contrast, and then increases a spatial depth of a photographed image.

In an exemplary embodiment, the camera lens group of the disclosure may satisfy a conditional expression 3.50<TTL/ImgH<4.20, wherein TTL is a distance, on the optical axis, from the object-side surface of the first lens to the imaging surface of the camera lens group; and ImgH is half of the diagonal length of the effective pixel area on the imaging surface of the camera lens group. More specifically, TTL and ImgH may further satisfy 3.93≤TTL/ImgH≤4.13. The camera lens group may satisfy a conditional expression 3.50<TTL/ImgH<4.20, the size of the lens set may be effectively controlled, and a resolution of the lens set is improved.

In an exemplary embodiment, the camera lens group of the disclosure may satisfy a conditional expression 0.50<R1/R2<1.50, wherein R1 is a curvature radius of the object-side surface of the first lens, and R2 is a curvature radius of the image-side surface of the first lens. More specifically, R1 and R2 may further satisfy 0.96≤R1/R2≤1.36. The radii of curvatures of the object-side surface and the image-side surface of the first lens are reasonably distributed, thereby effectively increasing the field of view of the camera lens group and reducing the size of the camera lens group, reasonable distribution of the refractive power of the lens set is facilitated, excessive concentration on the first lens is avoided, excessive high-order aberration is avoided, and aberration correction of the later lenses is facilitated.

In an exemplary embodiment, the camera lens group of the disclosure may satisfy a conditional expression 1.50<T23/T34<3.00, wherein T23 is a spacing distance, on the optical axis, between the second lens and the third lens, and T34 is a spacing distance, on the optical axis, between the third lens and the fourth lens. More specifically, T23 and T34 may further satisfy 1.65≤T23/T34≤2.62. By reasonably distributing the air space, on the optical axis, between the second lens and the third lens and the air space, on the optical axis, between the third lens and the fourth lens, the aberration of the camera lens group may be effectively reduced.

In an exemplary embodiment, the camera lens group of the disclosure may satisfy a conditional expression 1.00<R7/R10<3.60, wherein R7 is a curvature radius of the object-side surface of the fourth lens, and R10 is a curvature radius of the image-side surface of the fifth lens. More specifically, R7 and R10 may further satisfy 1.28≤R7/R10≤3.50. The radii of curvatures of the object-side surface of the fourth lens and the image-side surface of the fifth lens are reasonably distributed, thereby effectively balancing the aberration of the camera lens group and reducing the chromatic aberration of the camera lens group.

In an exemplary embodiment, the camera lens group of the disclosure may satisfy a conditional expression 1.50<CT3*10/TTL<2.00, wherein CT3 is a center thickness, on the optical axis, of the third lens, and TTL is a distance, on the optical axis, between the object-side surface of the first lens and the imaging surface of the camera lens group. More specifically, CT3 and TTL may further satisfy 1.59≤CT3*10/TTL≤1.76. By controlling the center thickness, on the optical axis, of the third lens, the third lens may be prevented from being too thin, and the caused ghost image risk is reduced.

In an exemplary embodiment, the camera lens group of the disclosure may satisfy a conditional expression −13.50<SAG41*100/SAG42<−6.50, wherein SAG41 is an on-axis distance from an intersection point of an object-side surface of the fourth lens and the optical axis to an effective radius vertex of the object-side surface of the fourth lens, and SAG42 is an on-axis distance from an intersection point of an image-side surface of the fourth lens and the optical axis to an effective radius vertex of the image-side surface of the fourth lens. More specifically, SAG41 and SAG42 may further satisfy −13.46≤SAG41*100/SAG42≤−6.55. By reasonably controlling SAG41 and SAG42, the aberration of the camera lens group may be effectively balanced.

In an exemplary embodiment, the camera lens group of the disclosure may satisfy a conditional expression ΣAT/TD<0.42, wherein ΣAT is the sum of spacing distances, on the optical axis, between any two adjacent lenses from the first lens to the fifth lens, and TD is a distance, on the optical axis, from the object-side surface of the first lens to the image-side surface of the fifth lens. More specifically, ΣAT and TD may further satisfy 0.37≤ΣAT/TD≤0.41. By controlling a size of the air space between the lenses in the camera lens group, the risk of ghost images generated by the camera lens group may be reduced.

In an exemplary embodiment, the camera lens group of the disclosure may satisfy a conditional expression 1.50<f3/f4<2.50, wherein f3 is an effective focal length of the third lens, and f4 is an effective focal length of the fourth lens. More specifically, f3 and f4 may further satisfy 1.67≤f3/f4≤1.99. The effective focal length of the third lens and the effective focal length of the fourth lens are reasonably distributed, thereby effectively reducing the chromatic aberration of the camera lens group, and increasing the field of view of the camera lens group.

In an exemplary embodiment, the camera lens group of the disclosure may satisfy a conditional expression 2.00<T45*100/ImgH<4.50, wherein T45 is a spacing distance, on the optical axis, between the fourth lens and the fifth lens, and ImgH is half of the diagonal length of the effective pixel area on the imaging surface of the camera lens group. More specifically, T45 and ImgH may further satisfy 2.42≤T45*100/ImgH≤4.37. By controlling the spacing distance, on the optical axis, between the fourth lens and the fifth lens, an illuminance of an edge field of view of the camera lens group may be effectively improved.

In an exemplary embodiment, the camera lens group of the disclosure may satisfy a conditional expression 2.00<R7/f4<4.00, wherein R7 is a curvature radius of the object-side surface of the fourth lens, and f4 is an effective focal length of the fourth lens. More specifically, R7 and f4 may further satisfy 2.38≤R7/f4≤3.42. The effective focal length of the fourth lens and the curvature radius of the object-side surface of the fourth lens are reasonably distributed, thereby preventing a size of the fourth lens from being too large, effectively correcting chromatic aberration of the camera lens group, and improving a resolution of the camera lens group.

In an exemplary embodiment, the camera lens group of the disclosure may satisfy a conditional expression 2.00<CT3/T34<3.50, wherein CT3 is a center thickness, on the optical axis, of the third lens, and T34 is a spacing distance, on the optical axis, between the third lens and the fourth lens. More specifically, CT3 and T34 may further satisfy 2.05≤CT3/T34≤3.23. By controlling the ratio of CT3 to T34, the risk of ghost images generated by the camera lens group may be effectively reduced.

In an exemplary embodiment, the camera lens group of the disclosure may satisfy a conditional expression 1.00<CT1/CT2<2.00, wherein CT1 is a center thickness, on the optical axis, of the first lens, and CT2 is a center thickness, on the optical axis, of the second lens. More specifically, CT1 and CT2 may further satisfy 1.39≤CT1/CT2≤1.76. The center thickness, on the optical axis, of the first lens and the center thickness, on the optical axis, of the second lens are reasonably distributed, thereby increasing the field of view of the camera lens group, and reducing an incident angle of light.

In an exemplary embodiment, the camera lens group may further include a diaphragm to improve the imaging quality of the lens. The aperture may be disposed, for example, between the third lens and the fourth lens.

Optionally, the camera lens group may further include an optical filter used for correcting color deviation and/or protective glass used for protecting a photosensitive element located on the imaging surface.

The camera lens group according to the above embodiment of the disclosure may employ a plurality of lenses, for example, five lenses described above. The refractive power and a surface type of each lens, the center thickness of each lens, the on-axis distance between the lenses, etc. are reasonably distributed, thereby effectively reducing the size of the lens, reducing the sensitivity of the lens, and improving the machinability of the lens, which makes the camera lens group more beneficial to production and processing and suitable for portable electronic products. Besides, by introducing the aspheric surface which is in non-rotational symmetry, an off-axis meridian aberration and a sagittal aberration of the camera lens group are corrected, thereby further improving the imaging image quality; and moreover, the size of the lens set may be reduced, the field of view may be increased, and the imaging quality may be improved while guaranteeing the amount of passing light.

In an embodiment of the disclosure, the mirror surface of each lens mostly uses an aspheric mirror face. The aspheric lens is characterized in that the curvature is continuously changed from a center of the lens to a periphery of the lens. Different from a spherical lens with a constant curvature from the center of the lens to the periphery of the lens, the aspheric lens has a better feature of a curvature radius and has the advantages of improving distortion aberration and astigmatism aberration. After the aspheric lens is used, aberration occurring during imaging may be eliminated as much as possible, thereby improving the imaging quality. Optionally, at least one of the object-side surface and the image-side surface of each of the first lens, the second lens, the third lens, the fourth lens and the fifth lens may be an aspheric surface. Optionally, both of the object-side surface and the image-side surface of each of the first lens, the second lens, the third lens, the fourth lens and the fifth lens may be aspheric surfaces.

However, it should be understood by those skilled in the art that without departing from the claimed technical solution, the number of lenses constituting the camera lens group may be varied to obtain various results and advantages described in this specification. For example, although described with five lenses as an example in an embodiment, the camera lens group is not limited to including five lenses. The camera lens group may also include other numbers of lenses if desired.

Specific examples of the camera lens group that may be suitable for use in the above embodiments are described further below with reference to the accompanying drawings.

Embodiment 1

A camera lens group according to embodiment 1 of the disclosure is described below with reference to FIGS. 1 and 2. FIG. 1 shows a structural schematic diagram of a camera lens group according to embodiment 1 of the disclosure.

As shown in FIG. 1, the camera lens group sequentially includes, from an object side to an image side along an optical axis: a first lens E1, a second lens E2, a third lens E3, a diaphragm STO, a fourth lens E4, a fifth lens E5, an optical filter E6 and an imaging surface S13.

The first lens E1 has a negative refractive power, an object-side surface S1 thereof is convex surface, and an image-side surface S2 thereof is concave surface. The second lens E2 has a negative refractive power, an object-side surface S3 thereof is convex surface, and an image-side surface S4 thereof is concave surface. The third lens E3 has a positive refractive power, an object-side surface S5 thereof is convex surface, and an image-side surface S6 thereof is convex surface. The fourth lens E4 has a positive refractive power, an object-side surface S7 thereof is convex surface, and an image-side surface S8 thereof is convex surface. The fifth lens E5 has a negative refractive power, an object-side surface S9 thereof is concave surface, and an image-side surface S10 thereof is concave surface. The optical filter E7 has an object-side surface S11 and an image-side surface S12. Light from an object sequentially passes through each of the faces S1 to S12 and is finally imaged on the imaging surface S13.

Table 1 shows a table of basic parameters for the camera lens group of embodiment 1, in which the curvature radius Y, the curvature radius X, the thickness, and the focal length are each in millimeters (mm).

fx is an effective focal length, in the X-axis direction, of the camera lens group, fy is an effective focal length, in the Y-axis direction, of the camera lens group, ImgH is half of the diagonal length of the effective pixel area on the imaging surface, and Semi-FOV is half of a maximum field of view of the camera lens group.

In embodiment 1, the object-side surface and an image-side surface of any one of the first lens E1, the second lens E2, the third lens E3, and the fourth lens E4, and the object-side surface S9 of the fifth lens E5 are rotationally symmetric aspheric surfaces. In this embodiment, the surface type x of each rotationally symmetric aspheric lens may be defined by using, but not limited to, the following aspheric formula:

$$x = \frac{ch^2}{1 + \sqrt{1 - (k+1)c^2 h^2}} + \sum A_i h^i \quad (1)$$

Wherein x is a vector height of a distance between the aspheric surface and a vertex of the aspheric surface when the aspheric surface is located at a position with the height h in the optical axis direction; c is a paraxial curvature of the aspheric surface, c=1/R (that is, the paraxial curvature c is an inverse of curvature radius R in Table 1 above); k is a Conic coefficient; and Ai is a correction coefficient of the i-th order of the aspheric surface. Table 2 below gives higher order term coefficients $A_4, A_6, A_8, A_{10}, A_{12}, A_{14}, A_{16}, A_{18}$ and $A_{20}$ that may be used for each of the aspheric mirror faces S1-S9 in embodiment 1.

TABLE 1

Embodiment 1: fx = 10.46 mm, fy = 8.68 mm, ImgH = 1.20 mm, Semi-FOV = 84.0°.

| Surface number | Surface type | Curvature radius Y | Curvature radius X | Thickness | Material Refractive index | Material Abbe number | Focal length | Conic coefficient Y | Conic coefficient X |
|---|---|---|---|---|---|---|---|---|---|
| OBJ | Spherical | Infinity | | Infinity | | | | | |
| S1 | Aspheric | 7.5047 | | 0.3964 | 1.54 | 55.80 | −41.41 | 7.0869 | |
| S2 | Aspheric | 5.5218 | | 0.5634 | | | | 10.3507 | |
| S3 | Aspheric | 19.0892 | | 0.2350 | 1.54 | 55.80 | −1.10 | −12.6168 | |
| S4 | Aspheric | 0.5756 | | 0.6159 | | | | −0.7337 | |
| S5 | Aspheric | 1.2068 | | 0.8738 | 1.66 | 23.80 | 1.58 | −0.1073 | |
| S6 | Aspheric | −5.2408 | | 0.1625 | | | | −77.5508 | |
| STO | Spherical | Infinity | | 0.1721 | | | | | |
| S7 | Aspheric | 2.7050 | | 0.7456 | 1.54 | 55.80 | 0.79 | 16.8765 | |
| S8 | Aspheric | −0.4612 | | 0.0378 | | | | −2.9248 | |
| S9 | Aspheric | −3.8317 | | 0.3229 | 1.66 | 23.80 | −0.95 | −99.0000 | |
| S10(AAS) | Aspheric | 0.7718 | 1.0446 | 0.2881 | | | | −37.9695 | −30.2477 |
| S11 | Spherical | Infinity | | 0.3000 | 1.52 | 64.17 | | | |
| S12 | Spherical | Infinity | | 0.2482 | | | | | |
| S13 | Spherical | Infinity | | 0.0000 | | | | | |

TABLE 2

| Surface number | A4 | A6 | A8 | A10 | A12 |
|---|---|---|---|---|---|
| S1 | −4.2196E−02 | 2.1131E−02 | −3.8752E−03 | −6.0636E−04 | −3.9956E−04 |
| S2 | 1.2244E−01 | −1.7644E−02 | 4.8665E−03 | −2.8927E−04 | −6.7023E−04 |
| S3 | −2.6467E−02 | −1.6582E−03 | −6.9285E−04 | −2.8535E−04 | −2.1998E−04 |
| S4 | −1.0070E−01 | 3.6687E−03 | 5.3111E−04 | 7.9115E−04 | −1.8218E−04 |
| S5 | −1.7992E−02 | 4.3759E−03 | 1.5323E−03 | −1.6070E−04 | 2.5673E−05 |
| S6 | 3.5801E−03 | 9.8091E−04 | −2.1594E−04 | 1.0979E−04 | −6.7533E−05 |
| S7 | −1.3779E−02 | −9.4131E−04 | 1.7003E−04 | −8.4860E−05 | 3.9936E−05 |
| S8 | −7.3451E−02 | −2.3476E−03 | 1.9749E−04 | 2.4834E−04 | −8.3403E−05 |
| S9 | −1.1722E−01 | −6.9226E−03 | −1.6082E−03 | 6.0669E−04 | −2.4816E−04 |

| Surface number | A14 | A16 | A18 | A20 |
|---|---|---|---|---|
| S1 | −9.1061E−05 | 2.6584E−05 | 1.1085E−04 | 1.1006E−05 |
| S2 | 5.3933E−04 | −6.6273E−04 | 5.3119E−05 | −6.6747E−05 |
| S3 | 2.3010E−05 | 6.3310E−06 | −1.6897E−04 | 4.6315E−05 |
| S4 | −1.9301E−04 | 4.5544E−05 | −3.6948E−05 | −1.3804E−05 |
| S5 | −5.9780E−05 | 1.2595E−05 | −2.3526E−05 | 2.8281E−06 |
| S6 | 3.4598E−05 | −1.9376E−05 | 1.5246E−05 | −4.0450E−06 |
| S7 | −2.0688E−05 | 3.8439E−06 | −1.6050E−06 | 5.2572E−07 |
| S8 | 8.3026E−05 | −4.7012E−05 | 1.4210E−05 | −1.1558E−05 |
| S9 | 1.6396E−04 | 1.0516E−05 | −7.5074E−05 | 1.9808E−05 |

It may also be seen from Table 1 that the image-side surface S10 of the fifth lens E5 is an aspheric surface which is in non-rotational symmetry (that is, AAS), and the surface type of the aspheric surface which is in non-rotational symmetry may be defined by using, but is not limited to, the following non-rotationally symmetric aspheric surface formula:

$$z = \frac{(CUX)x^2 + (CUY)y^2}{1 + \sqrt{1 - (1+KX)(CUX)^2 x^2 - (1+KY)(CUY)^2 y^2}} + $$
$$AR\{(1-AP)x^2 + (1+AP)y^2\}^2 +$$
$$BR\{(1-BP)x^2 + (1+BP)y^2\}^3 +$$
$$CR\{(1-CP)x^2 + (1+CP)y^2\}^4 +$$
$$DR\{(1-DP)x^2 + (1+DP)y^2\}^5 + ER\{(1-EP)x^2 + (1+EP)y^2\}^6 +$$
$$FR\{(1-FP)x^2 + (1+FP)y^2\}^7 + GR\{(1-GP)x^2 + (1+GP)y^2\}^8 +$$
$$HR\{(1-HP)x^2 + (1+HP)y^2\}^9 + JR\{(1-JP)x^2 + (1+JP)y^2\}^{10} \quad (2)$$

wherein z is a vector height of a plane parallel to the Z-axis direction; CUX and CUY are curvatures (=1/curvature radius) of vertexes of an X-axis direction face and a Y-axis direction face respectively; KX and KY are Conic coefficients in the X-axis direction and the Y-axis direction respectively; AR, BR, CR, DR, ER, FR, GR, HR and JR are 4th order, 6th order, 8th order, 10th order, 12th order, 14th order, 16th order, 18th order and 20th order coefficients in the aspheric rotational symmetry component respectively; and AP, BP, CP, DP, EP, FP, GP, HP, JP are 4th order, 6th order, 8th order, 10th order, 12th order, 14th order, 16th order, 18th order and 20th order coefficients in the aspheric non-rotational symmetry component respectively. Table 3 below gives the higher order coefficients which may be used in the aspheric surface S10 which is in non-rotational symmetry, in embodiment 1.

TABLE 3

| AAS | AR | BR | CR | DR | ER | FR | GR | HR | JR |
|---|---|---|---|---|---|---|---|---|---|
| S10 | −2.4753E−01 | −4.1839E−02 | 4.5962E−02 | −7.2921E−02 | −9.8360E−04 | −2.9848E−03 | 2.9923E−04 | 4.5523E−04 | −5.9963E−04 |

| AAS | AP | BP | CP | DP | EP | FP | GP | HP | JP |
|---|---|---|---|---|---|---|---|---|---|
| S10 | −5.3834E−02 | 2.1492E−01 | 7.5082E−04 | −1.8801E−02 | −3.1592E−01 | −7.0681E−02 | −4.9475E−01 | 3.9986E−01 | 2.8804E−01 |

Figure 2:
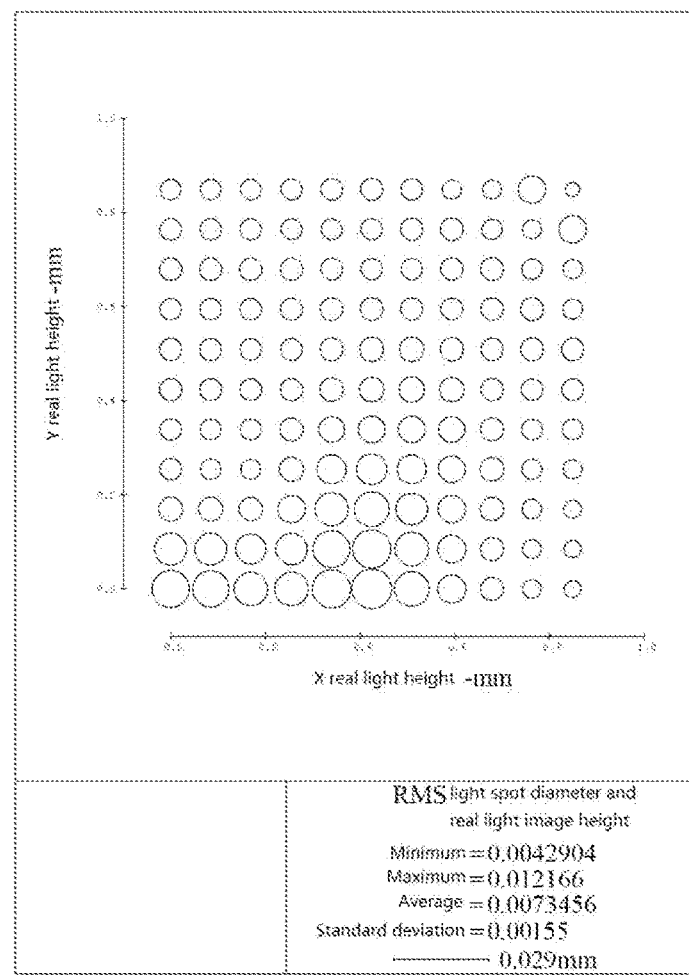
FIG. 2 schematically shows a condition of a diameter, within a first quadrant, of a RMS spot of the camera lens group of embodiment 1.

FIG. 2 shows a condition of a diameter, at different image height positions within a first quadrant, of a RMS spot of the camera lens group of embodiment 1. FIG. 2 shows that the camera lens group given in embodiment 1 is capable of achieving good imaging quality.

Embodiment 2

Figure 3:
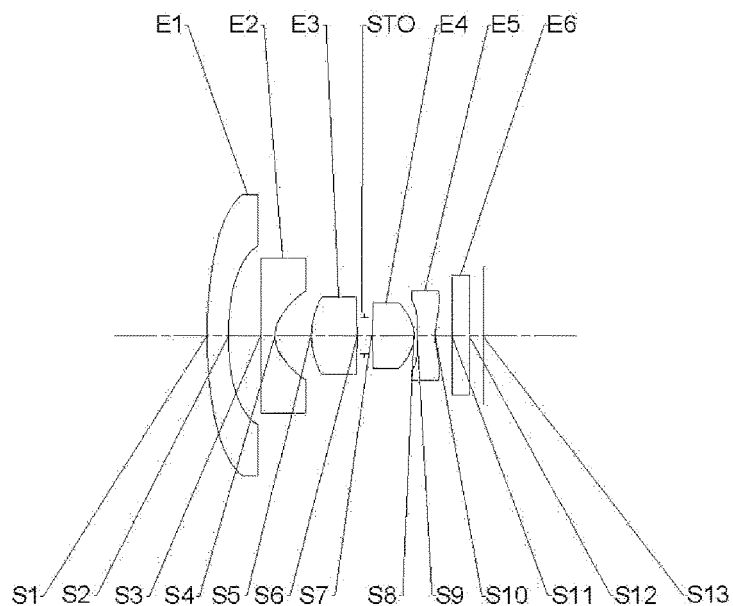
FIG. 3 shows a structural schematic diagram of a camera lens group according to embodiment 2 of the disclosure.

A camera lens group according to embodiment 2 of the disclosure is described below with reference to FIGS. 3 and 4. In this and the following embodiments, part of the description similar to embodiment 1 will be omitted for the sake of brevity. FIG. 3 shows a structural schematic diagram of a camera lens group according to embodiment 2 of the disclosure.

As shown in FIG. 3, the camera lens group sequentially includes, from an object side to an image side along an optical axis: a first lens E1, a second lens E2, a third lens E3, a diaphragm STO, a fourth lens E4, a fifth lens E5, an optical filter E6 and an imaging surface S13.

The first lens E1 has a negative refractive power, an object-side surface S1 thereof is convex surface, and an image-side surface S2 thereof is concave surface. The second lens E2 has a negative refractive power, an object-side surface S3 thereof is convex surface, and an image-side surface S4 thereof is concave surface. The third lens E3 has a positive refractive power, an object-side surface S5 thereof is convex surface, and an image-side surface S6 thereof is convex surface. The fourth lens E4 has a positive refractive power, an object-side surface S7 thereof is convex surface, and an image-side surface S8 thereof is convex surface. The fifth lens E5 has a negative refractive power, an object-side surface S9 thereof is concave surface, and an image-side surface S10 thereof is concave surface. The optical filter E7 has an object-side surface S11 and an image-side surface S12. Light from an object sequentially passes through each of the faces S1 to S12 and is finally imaged on the imaging surface S13.

Table 4 shows a table of basic parameters for the camera lens group of embodiment 2, in which the curvature radius Y, the curvature radius X, the thickness, and the focal length are each in millimeters (mm). Table 5 shows higher order term coefficients that may be used for each aspheric mirror face in embodiment 2, wherein each aspheric surface type may be defined by formula (1) given in embodiment 1 above. Table 7 shows higher order coefficients of rotational symmetry components and the non-rotational symmetry components which may be used for the aspheric surfaces S5 and S6 which are in non-rotational symmetry, in embodiment 2, wherein the non-rotational symmetry aspheric surface type may be defined by formula (2) given in embodiment 1 above.

TABLE 4

Embodiment 2: fx = 7.80 mm, fy = 7.38 mm, ImgH = 1.20 mm, Semi-FOV = 86.0°.

| Surface number | Surface type | Curvature radius Y | Curvature radius X | Thickness | Refractive index | Abbe number | Focal length | Conic coefficient Y | Conic coefficient X |
|---|---|---|---|---|---|---|---|---|---|
| OBJ | Spherical | Infinity | | Infinity | | | | | |
| S1 | Aspheric | 7.2773 | | 0.3810 | 1.54 | 55.80 | −40.13 | 7.1916 | |
| S2 | Aspheric | 5.3546 | | 0.5674 | | | | 10.5623 | |
| S3 | Aspheric | 26.3717 | | 0.2500 | 1.54 | 55.80 | −1.12 | −99.0000 | |
| S4 | Aspheric | 0.5912 | | 0.6256 | | | | −0.7168 | |
| S5(AAS) | Aspheric | 1.2038 | 1.2082 | 0.8079 | 1.66 | 23.80 | 1.54 | −0.1902 | −0.1437 |
| S6(AAS) | Aspheric | −4.6904 | −4.8167 | 0.1202 | | | | −153.6521 | −119.1946 |
| STO | Spherical | Infinity | | 0.1349 | | | | | |
| S7 | Aspheric | 2.8497 | | 0.7421 | 1.54 | 55.80 | 0.90 | 18.0406 | |
| S8 | Aspheric | −0.5390 | | 0.0513 | | | | −2.8846 | |
| S9 | Aspheric | −55.3746 | | 0.3157 | 1.66 | 23.80 | −1.50 | 55.6041 | |
| S10 | Aspheric | 1.0067 | | 0.2967 | | | | −14.3452 | |
| S11 | Spherical | Infinity | | 0.3000 | 1.52 | 64.17 | | | |
| S12 | Spherical | Infinity | | 0.2568 | | | | | |
| S13 | Spherical | Infinity | | | | | | | |

TABLE 5

| Surface number | A4 | A6 | A8 | A10 | A12 |
|---|---|---|---|---|---|
| S1 | −4.8104E−02 | 1.9339E−02 | −2.7738E−03 | −1.0711E−03 | −3.5728E−04 |
| S2 | 1.2867E−01 | −9.7176E−03 | 2.5792E−03 | −6.5968E−04 | −1.5143E−04 |
| S3 | −2.9699E−02 | −1.7149E−03 | −2.1259E−04 | −6.7334E−05 | −1.5982E−04 |
| S4 | −8.7538E−02 | 4.4587E−03 | 1.5741E−03 | 1.7622E−05 | 1.2447E−05 |
| S7 | −1.3063E−02 | −7.0235E−04 | 2.3426E−05 | −2.4815E−05 | −2.1335E−05 |
| S8 | −7.3556E−02 | −1.8894E−03 | 7.5369E−05 | −3.5644E−05 | −6.3790E−05 |
| S9 | −1.2116E−01 | −7.9443E−03 | −4.9753E−04 | 7.6154E−05 | −1.0623E−05 |
| S10 | −1.3674E−01 | −1.1398E−03 | −3.4868E−04 | −1.6616E−04 | −8.6479E−05 |

| Surface number | A14 | A16 | A18 | A20 |
|---|---|---|---|---|
| S1 | −1.0318E−04 | −5.3000E−06 | 3.3734E−05 | −3.3263E−05 |
| S2 | −1.2931E−04 | 1.9025E−05 | 9.7865E−05 | 9.9903E−05 |
| S3 | −5.8839E−05 | −2.2504E−05 | 4.8678E−05 | 1.8554E−05 |
| S4 | −5.5885E−05 | −4.5319E−06 | −7.6665E−06 | 3.2128E−05 |
| S7 | −1.6631E−05 | 1.2103E−06 | 1.1903E−06 | 1.7720E−06 |
| S8 | −8.1912E−05 | −5.7643E−05 | −5.9544E−06 | 9.0320E−06 |
| S9 | −4.3477E−05 | −4.0189E−05 | −6.5624E−06 | 1.1570E−05 |
| S10 | −6.4513E−05 | 4.0379E−05 | 3.5607E−05 | 5.2635E−06 |

TABLE 6

| AAS | AR | BR | CR | DR | ER | FR | GR | HR | JR |
|---|---|---|---|---|---|---|---|---|---|
| S5 | −1.2799E−01 | 1.5275E−02 | 1.2740E−01 | 1.8837E−01 | 1.1341E−03 | −7.5590E−04 | −1.9465E−03 | −2.1399E−03 | −9.5810E−04 |
| S6 | −5.7111E−02 | 8.9993E−01 | −1.6235E+00 | 2.1594E+00 | 1.1703E−01 | 8.1899E−01 | 2.0553E+00 | 1.3685E+00 | −1.6630E+01 |

TABLE 6-continued

| AAS | AP | BP | CP | DP | EP | FP | GP | HP | JP |
|---|---|---|---|---|---|---|---|---|---|
| S5 | 1.3917E−02 | 1.8922E−01 | 3.7765E−03 | −8.2241E−04 | −1.4213E+00 | 3.0963E−01 | −1.0956E+00 | 6.2597E−01 | 6.2567E−01 |
| S6 | −1.8966E−02 | −1.4438E−02 | 1.6826E−02 | −1.1088E−02 | 6.2638E−01 | 6.2576E−01 | 6.2585E−01 | 6.2589E−01 | 6.2589E−01 |

Figure 4:
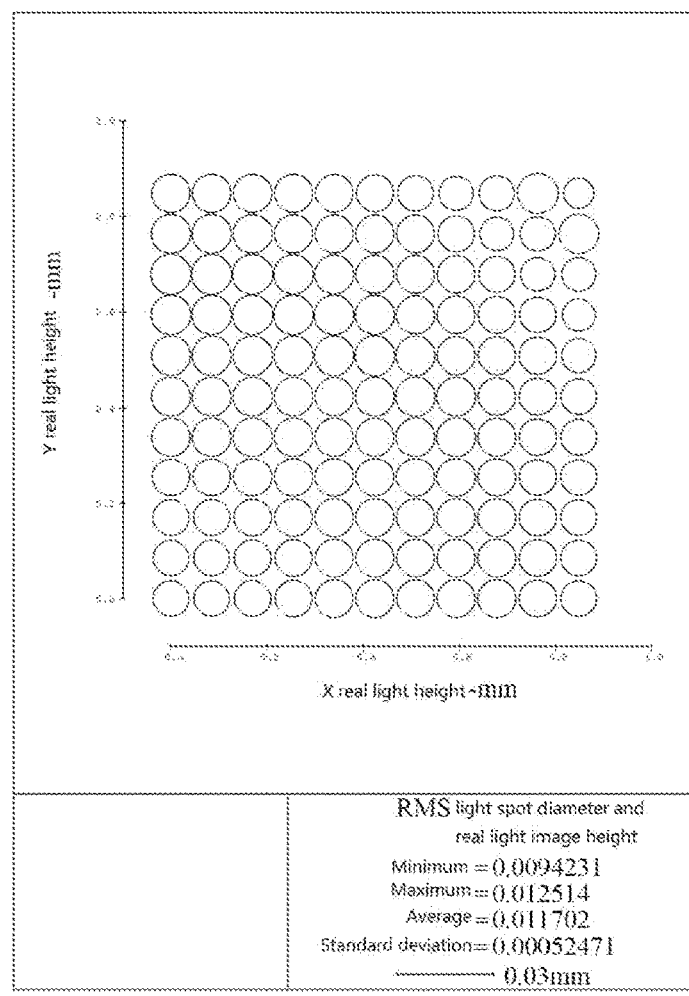
FIG. 4 schematically shows a condition of a diameter, within a first quadrant, of a RMS spot of the camera lens group of embodiment 2.

FIG. 4 shows a condition of a diameter, at different image height positions within a first quadrant, of a RMS spot of the camera lens group of embodiment 2. FIG. 4 shows that the camera lens group given in embodiment 2 is capable of achieving good imaging quality.

Embodiment 3

Figure 5:
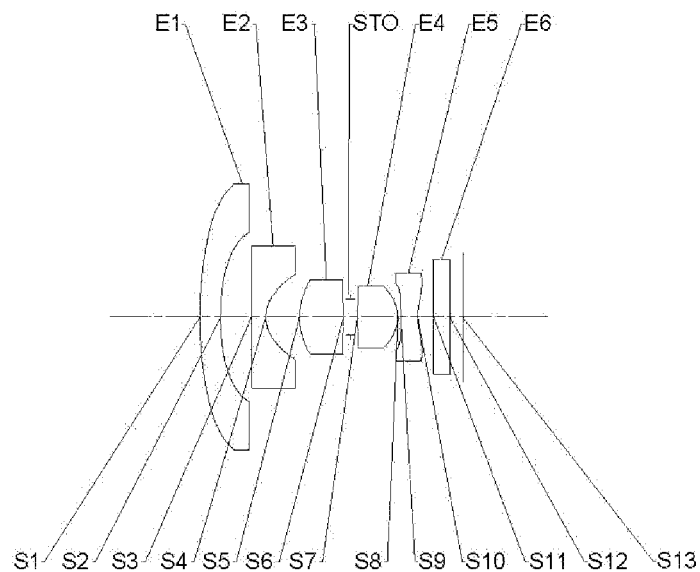
FIG. 5 shows a structural schematic diagram of a camera lens group according to embodiment 3 of the disclosure.

A camera lens group according to embodiment 3 of the disclosure is described below with reference to FIGS. 5 and 6. FIG. 5 shows a structural schematic diagram of a camera lens group according to embodiment 3 of the disclosure.

As shown in FIG. 5, the camera lens group sequentially includes, from an object side to an image side along an optical axis: a first lens E1, a second lens E2, a third lens E3, a diaphragm STO, a fourth lens E4, a fifth lens E5, an optical filter E6 and an imaging surface S13.

The first lens E1 has a negative refractive power, an object-side surface S1 thereof is convex surface, and an image-side surface S2 thereof is concave surface. The second lens E2 has a negative refractive power, an object-side surface S3 thereof is convex surface, and an image-side surface S4 thereof is concave surface. The third lens E3 has a positive refractive power, an object-side surface S5 thereof is convex surface, and an image-side surface S6 thereof is convex surface. The fourth lens E4 has a positive refractive power, an object-side surface S7 thereof is convex surface, and an image-side surface S8 thereof is convex surface. The fifth lens E5 has a negative refractive power, an object-side surface S9 thereof is convex surface, and an image-side surface S10 thereof is concave surface. The optical filter E7 has an object-side surface S11 and an image-side surface S12. Light from an object sequentially passes through each of the faces S1 to S12 and is finally imaged on the imaging surface S13.

Table 7 shows a table of basic parameters for the camera lens group of embodiment 3, in which the curvature radius Y, the curvature radius X, the thickness, and the focal length are each in millimeters (mm). Table 8 shows higher order term coefficients that may be used for each aspheric mirror face in embodiment 3, wherein each aspheric surface type may be defined by formula (1) given in embodiment 1 above. Table 9 shows higher order coefficients of rotational symmetry components and non-rotational symmetry components which may be used for the aspheric surfaces S3 and S8 which are in non-rotational symmetry, in embodiment 3, wherein the non-rotational symmetry aspheric surface type may be defined by formula (2) given in embodiment 1 above.

TABLE 7

Embodiment 3: fx = 7.81 mm, fy = 7.78 mm, ImgH = 1.21 mm, Semi-FOV = 86.5°.

| Surface number | Surface type | Curvature radius Y | Curvature radius X | Thickness | Refractive index | Abbe number | Focal length | Conic coefficient Y | Conic coefficient X |
|---|---|---|---|---|---|---|---|---|---|
| OBJ | Spherical | Infinity | | Infinity | | | | | |
| S1 | Aspheric | 7.2846 | | 0.3839 | 1.54 | 55.80 | −40.30 | 7.1840 | |
| S2 | Aspheric | 5.3636 | | 0.5668 | | | | 10.5139 | |
| S3(AAS) | Aspheric | 20.9216 | 25.9125 | 0.2637 | 1.54 | 55.80 | −1.12 | −1715.4813 | −471.0313 |
| S4 | Aspheric | 0.5879 | | 0.6244 | | | | −0.7181 | |
| S5 | Aspheric | 1.2050 | | 0.8056 | 1.66 | 23.80 | 1.55 | −0.1759 | |
| S6 | Aspheric | −4.7951 | | 0.1241 | | | | −99.0000 | |
| STO | Spherical | Infinity | | 0.1354 | | | | | |
| S7 | Aspheric | 2.8038 | | 0.7470 | 1.54 | 55.80 | 0.92 | 17.6815 | |
| S8(AAS) | Aspheric | −0.5495 | −0.5571 | 0.0504 | | | | −3.0023 | −2.8297 |
| S9 | Aspheric | 20.9685 | | 0.3117 | 1.66 | 23.80 | −1.58 | 55.6065 | |
| S10 | Aspheric | 0.9852 | | 0.2972 | | | | −13.7852 | |
| S11 | Spherical | Infinity | | 0.3000 | 1.52 | 64.17 | | | |
| S12 | Spherical | Infinity | | 0.2573 | | | | | |
| S13 | Spherical | Infinity | | | | | | | |

TABLE 8

| Surface number | A4 | A6 | A8 | A10 | A12 |
|---|---|---|---|---|---|
| S1 | −4.6612E−02 | 2.0300E−02 | −2.0155E−03 | −8.7826E−04 | −2.4468E−04 |
| S2 | 1.3170E−01 | −1.0571E−02 | 2.5988E−03 | −2.5360E−04 | −2.7921E−04 |
| S4 | −8.8918E−02 | 4.7581E−03 | 1.5712E−03 | −7.3711E−05 | 6.8795E−05 |
| S5 | −2.0837E−02 | 5.3551E−03 | 9.2887E−04 | 1.2591E−04 | 1.4937E−05 |
| S6 | 3.9016E−03 | 7.5714E−04 | −3.0111E−05 | −1.3403E−05 | −9.1084E−06 |
| S7 | −1.3210E−02 | −7.8371E−04 | 1.2511E−05 | −3.0606E−05 | −1.8566E−05 |

TABLE 8-continued

| S9 | −1.2185E−01 | −7.7132E−03 | −5.1758E−04 | 8.8644E−05 | 4.8046E−05 |
| S10 | −1.3473E−01 | −1.6374E−03 | −2.5898E−04 | −1.3004E−04 | 2.6668E−05 |

| Surface number | A14 | A16 | A18 | A20 |
|---|---|---|---|---|
| S1 | −7.1651E−05 | 6.6213E−06 | 2.3027E−05 | −2.3140E−05 |
| S2 | −2.3777E−04 | −1.2656E−04 | −5.8752E−05 | 5.8118E−05 |
| S4 | −1.7512E−05 | 3.7326E−05 | −1.1577E−05 | −1.3005E−05 |
| S5 | 3.6998E−05 | −3.3350E−05 | −2.2424E−05 | −1.7783E−05 |
| S6 | 1.3974E−05 | 1.3020E−05 | 1.0063E−05 | −4.4763E−06 |
| S7 | −1.6483E−05 | 4.6371E−07 | 1.0758E−06 | 1.5443E−06 |
| S9 | 6.9558E−06 | 3.7934E−05 | −1.9458E−06 | 7.9105E−06 |
| S10 | 3.4010E−05 | 9.6874E−05 | 3.9443E−06 | 1.8624E−05 |

TABLE 9

| AAS | AR | BR | CR | DR | ER |
|---|---|---|---|---|---|
| S3 | −5.1232E−03 | −5.4782E−04 | 9.5369E−05 | −8.1376E−05 | −3.4758E−07 |
| S8 | −3.8330E−01 | −2.8609E−01 | 1.7493E−01 | −1.2148E−02 | 1.9414E−02 |

| AAS | FR | GR | HR | JR |
|---|---|---|---|---|
| S3 | −1.0773E−07 | −2.0947E−07 | −6.4873E−10 | −4.7648E−09 |
| S8 | 8.7729E−03 | −2.7862E−02 | −6.4710E−03 | −1.2249E+01 |

| AAS | AP | BP | CP | DP | EP |
|---|---|---|---|---|---|
| S3 | −6.3317E−02 | −1.9462E−02 | 3.8619E−02 | 3.3522E−02 | 1.0789E+00 |
| S8 | 1.6546E−02 | 1.3137E−02 | 6.2810E−02 | 8.7161E−01 | 7.0630E−01 |

| AAS | FP | GP | HP | JP |
|---|---|---|---|---|
| S3 | 5.7116E−01 | −2.6501E−01 | 3.3635E−01 | 3.3671E−01 |
| S8 | 7.6735E−01 | 7.8913E−01 | 3.3322E−01 | 1.9607E−02 |

Figure 6:
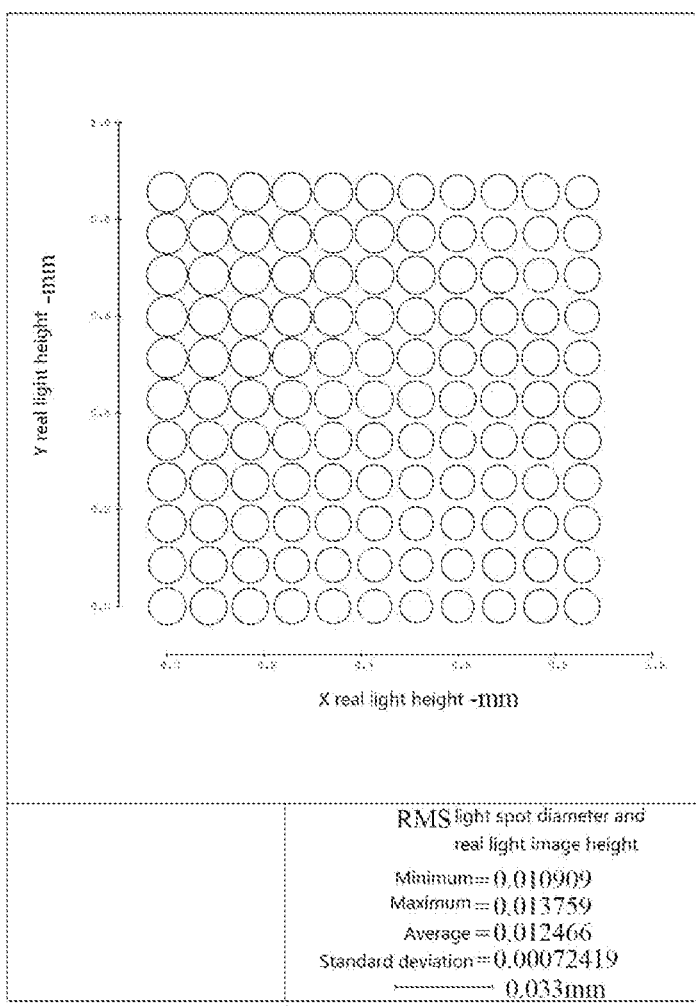
FIG. 6 schematically shows a condition of a diameter, within a first quadrant, of a RMS spot of the camera lens group of embodiment 3.

FIG. 6 shows a condition of a diameter, at different image height positions within a first quadrant, of a RMS spot of the camera lens group of embodiment 3. FIG. 6 shows that the camera lens group given in embodiment 3 is capable of achieving good imaging quality.

Embodiment 4

Figure 7:
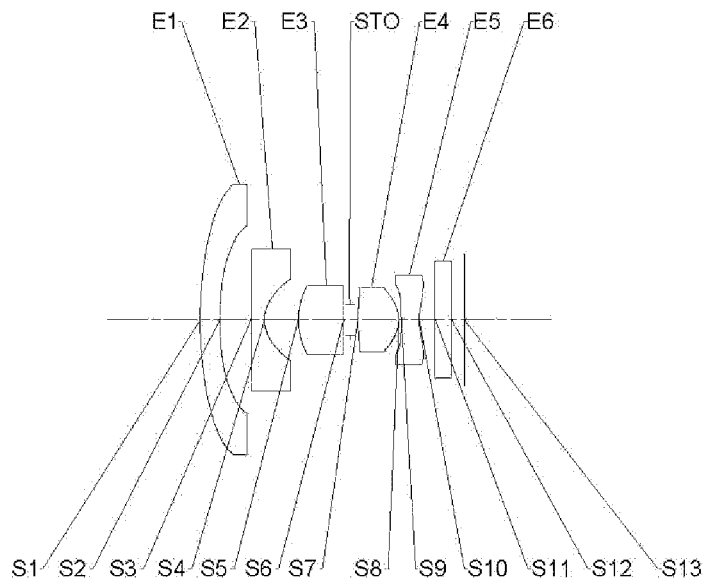
FIG. 7 shows a structural schematic diagram of a camera lens group according to embodiment 4 of the disclosure.

A camera lens group according to embodiment 4 of the disclosure is described below with reference to FIGS. 7 and 8. FIG. 7 shows a structural schematic diagram of a camera lens group according to embodiment 4 of the disclosure.

As shown in FIG. 7, the camera lens group sequentially includes, from an object side to an image side along an optical axis: a first lens E1, a second lens E2, a third lens E3, a diaphragm STO, a fourth lens E4, a fifth lens E5, an optical filter E6 and an imaging surface S13.

The first lens E1 has a positive refractive power, an object-side surface S1 thereof is convex surface, and an image-side surface S2 thereof is concave surface. The second lens E2 has a negative refractive power, an object-side surface S3 thereof is convex surface, and an image-side surface S4 thereof is concave surface. The third lens E3 has a positive refractive power, an object-side surface S5 thereof is convex surface, and an image-side surface S6 thereof is convex surface. The fourth lens E4 has a positive refractive power, an object-side surface S7 thereof is convex surface, and an image-side surface S8 thereof is convex surface. The fifth lens E5 has a negative refractive power, an object-side surface S9 thereof is convex surface, and an image-side surface S10 thereof is concave surface. The optical filter E7 has an object-side surface S11 and an image-side surface S12. Light from an object sequentially passes through each of the faces S1 to S12 and is finally imaged on the imaging surface S13.

Table 10 shows a table of basic parameters for the camera lens group of embodiment 4, in which the curvature radius Y, the curvature radius X, the thickness, and the focal length are each in millimeters (mm). Table 11 shows higher order term coefficients that may be used for each aspheric mirror face in embodiment 4, wherein each aspheric surface type may be defined by formula (1) given in embodiment 1 above. Table 12 shows higher order coefficients of rotational symmetry components and non-rotational symmetry components which may be used for the aspheric surfaces S5 and S8 which are in non-rotational symmetry, in embodiment 4, wherein the non-rotational symmetry aspheric surface type may be defined by formula (2) given in embodiment 1 above.

TABLE 10

Embodiment 4: fx = 8.26 mm, fy = 7.76 mm, ImgH = 1.20 mm, Semi-FOV = 85.9°.

| Surface number | Surface type | Curvature radius Y | Curvature radius X | Thickness | Material Refractive index | Material Abbe number | Focal length | Conic coefficient Y | Conic coefficient X |
|---|---|---|---|---|---|---|---|---|---|
| OBJ | Spherical | Infinity | | Infinity | | | | | |
| S1 | Aspheric | 7.3381 | | 0.3629 | 1.54 | 55.80 | 228.92 | 7.0590 | |
| S2 | Aspheric | 7.6629 | | 0.5650 | | | | 12.6122 | |
| S3 | Aspheric | 30.5161 | | 0.2406 | 1.54 | 55.80 | −1.11 | −29.4741 | |
| S4 | Aspheric | 0.5906 | | 0.6201 | | | | −0.7183 | |
| S5(AAS) | Aspheric | 1.1972 | 1.2130 | 0.8206 | 1.66 | 23.80 | 1.56 | −0.2594 | −0.1402 |
| S6 | Aspheric | −5.1335 | | 0.1257 | | | | −99.0000 | |
| STO | Spherical | Infinity | | 0.1365 | | | | | |
| S7 | Aspheric | 2.7437 | | 0.7405 | 1.54 | 55.80 | 0.91 | 17.4128 | |
| S8(AAS) | Aspheric | −0.5426 | −0.5461 | 0.0468 | | | | −2.9864 | −2.7748 |
| S9 | Aspheric | 819.1748 | | 0.3256 | 1.66 | 23.80 | −1.53 | 55.6039 | |
| S10 | Aspheric | 1.0028 | | 0.2931 | | | | −14.2100 | |
| S11 | Spherical | Infinity | | 0.3000 | 1.52 | 64.17 | | | |
| S12 | Spherical | Infinity | | 0.2532 | | | | | |
| S13 | Spherical | Infinity | | | | | | | |

TABLE 11

| Surface number | A4 | A6 | A8 | A10 | A12 |
|---|---|---|---|---|---|
| S1 | −4.7725E−02 | 1.9245E−02 | 5.0249E−04 | 2.3130E−04 | −3.1277E−04 |
| S2 | 1.5044E−01 | −5.1905E−03 | 3.0870E−03 | 1.0243E−03 | 8.4089E−05 |
| S3 | −3.0104E−02 | −1.0800E−03 | −1.2243E−04 | 7.7274E−05 | 4.8737E−06 |
| S4 | −8.7608E−02 | 3.4715E−03 | 1.3210E−03 | −5.9579E−04 | −2.1447E−04 |
| S6 | 4.0985E−03 | 6.0501E−04 | 5.7322E−05 | 9.2798E−06 | 3.3122E−09 |
| S7 | −1.3415E−02 | −7.8508E−04 | 3.4820E−05 | −4.3767E−05 | 3.7319E−06 |
| S9 | −1.2001E−01 | −7.3552E−03 | −4.4908E−04 | 1.0398E−04 | −5.4031E−06 |
| S10 | −1.3738E−01 | −1.8933E−03 | −2.9408E−04 | −1.9147E−04 | −1.2962E−04 |

| Surface number | A14 | A16 | A18 | A20 |
|---|---|---|---|---|
| S1 | −3.2533E−04 | −2.2049E−05 | 2.0128E−04 | 4.1743E−05 |
| S2 | 6.2131E−05 | −8.2301E−05 | −3.1593E−05 | 4.1857E−05 |
| S3 | −2.6121E−05 | −4.5038E−05 | 4.2656E−05 | 2.3015E−05 |
| S4 | −1.6483E−04 | −4.9854E−05 | −7.4310E−05 | 8.4342E−06 |
| S6 | 4.2728E−06 | 1.3935E−07 | 1.9380E−06 | −1.6477E−06 |
| S7 | −1.4839E−05 | 7.4666E−06 | −1.7268E−06 | 6.6416E−07 |
| S9 | 1.5252E−05 | 2.1874E−05 | 3.7409E−06 | −4.4371E−06 |
| S10 | −4.1553E−05 | 6.5389E−05 | 1.0945E−05 | −1.0106E−05 |

TABLE 12

| AAS | AR | BR | CR | DR | ER |
|---|---|---|---|---|---|
| S5 | −1.3014E−01 | 1.3734E−02 | 1.0933E−01 | 1.6249E−01 | −3.6236E−03 |
| S8 | −3.8552E−01 | −2.8466E−01 | 1.8247E−01 | 2.0251E−04 | −1.5970E−04 |

| AAS | FR | GR | HR | JR |
|---|---|---|---|---|
| S5 | −4.2047E−03 | −1.9968E−02 | −1.1456E−02 | 4.0333E−02 |
| S8 | 9.1477E−03 | 7.7047E−03 | 1.9277E−03 | −4.9952E−02 |

| AAS | AP | BP | CP | DP | EP |
|---|---|---|---|---|---|
| S5 | 2.9047E−02 | 5.2129E−01 | −8.7124E−03 | −2.1522E−02 | −4.8537E−01 |
| S8 | 2.2306E−02 | 1.4120E−02 | 6.1292E−02 | −7.2131E−01 | 3.0400E+00 |

| AAS | FP | GP | HP | JP |
|---|---|---|---|---|
| S5 | −7.0718E−01 | 5.1313E−01 | 4.0195E−01 | 3.5278E−01 |
| S8 | 1.0116E+00 | 1.1067E+00 | −1.2428E+00 | 6.7330E−01 |

Figure 8:
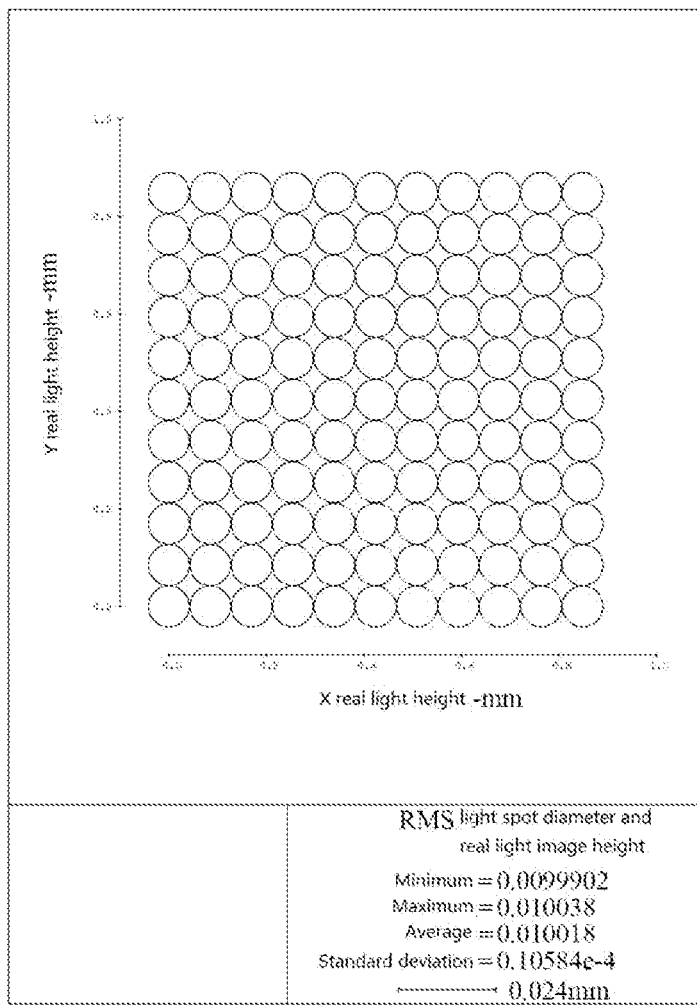
FIG. 8 schematically shows a condition of a diameter, within a first quadrant, of a RMS spot of the camera lens group of embodiment 4.

FIG. 8 shows a condition of a diameter, at different image height positions within a first quadrant, of a RMS spot of the camera lens group of embodiment 4. FIG. 8 shows that the camera lens group given in embodiment 4 is capable of achieving good imaging quality.

Embodiment 5

Figure 9:
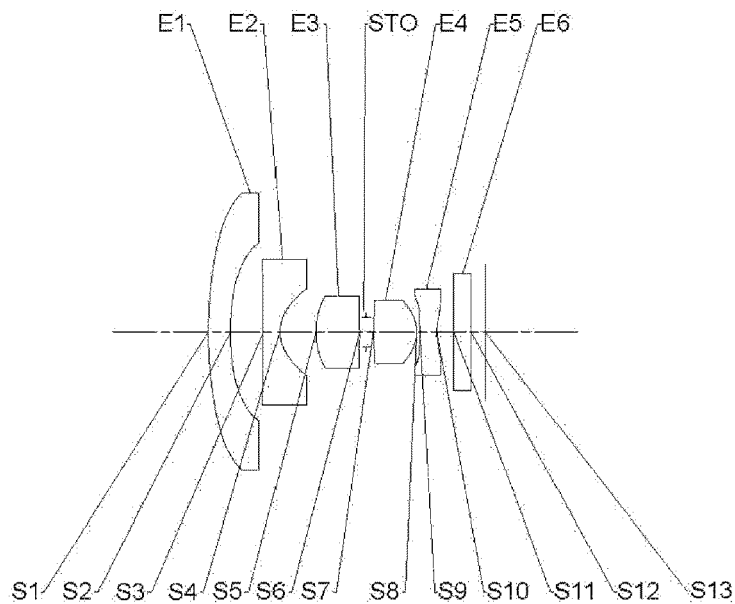
FIG. 9 shows a structural schematic diagram of a camera lens group according to embodiment 5 of the disclosure.

A camera lens group according to embodiment 5 of the disclosure is described below with reference to FIGS. 9 and 10. FIG. 9 shows a structural schematic diagram of a camera lens group according to embodiment 5 of the disclosure.

As shown in FIG. 9, the camera lens group sequentially includes, from an object side to an image side along an optical axis: a first lens E1, a second lens E2, a third lens E3, a diaphragm STO, a fourth lens E4, a fifth lens E5, an optical filter E6 and an imaging surface S13.

The first lens E1 has a negative refractive power, an object-side surface S1 thereof is convex surface, and an image-side surface S2 thereof is concave surface. The second lens E2 has a negative refractive power, an object-side surface S3 thereof is concave surface, and an image-side surface S4 thereof is concave surface. The third lens E3 has a positive refractive power, an object-side surface S5 thereof is convex surface, and an image-side surface S6 thereof is convex surface. The fourth lens E4 has a positive refractive power, an object-side surface S7 thereof is convex surface, and an image-side surface S8 thereof is convex surface. The fifth lens E5 has a negative refractive power, an object-side surface S9 thereof is concave surface, and an image-side surface S10 thereof is concave surface. The optical filter E7 has an object-side surface S11 and an image-side surface S12. Light from an object sequentially passes through each of the faces S1 to S12 and is finally imaged on the imaging surface S13.

Table 13 shows a table of basic parameters for the camera lens group of embodiment 5, in which the curvature radius Y, the curvature radius X, the thickness, and the focal length are each in millimeters (mm). Table 14 shows higher order term coefficients that may be used for each aspheric mirror face in embodiment 5, wherein each aspheric surface type may be defined by formula (1) given in embodiment 1 above. Table 15 shows higher order coefficients of rotational symmetry components and non-rotational symmetry components which may be used for the aspheric surfaces S8 and S9 which are in non-rotational symmetry, in embodiment 5, wherein the non-rotational symmetry aspheric surface type may be defined by formula (2) given in embodiment 1 above.

TABLE 13

| | | | | | Material | | | Conic | Conic |
| | | | | | Refractive | Abbe | Focal | coefficient | coefficient |
| Surface number | Surface type | Curvature radius Y | Curvature radius X | Thickness | index | number | length | Y | X |
|---|---|---|---|---|---|---|---|---|---|
| OBJ | Spherical | Infinity | | Infinity | | | | | |
| S1 | Aspheric | 7.2599 | | 0.3879 | 1.54 | 55.80 | −40.69 | 7.2559 | |
| S2 | Aspheric | 5.3614 | | 0.5731 | | | | 10.4818 | |
| S3 | Aspheric | −174.7252 | | 0.2785 | 1.54 | 55.80 | −1.12 | −998.5946 | |
| S4 | Aspheric | 0.6096 | | 0.6280 | | | | −0.7190 | |
| S5 | Aspheric | 1.2006 | | 0.7659 | 1.66 | 23.80 | 1.53 | −0.1476 | |
| S6 | Aspheric | −4.6577 | | 0.1051 | | | | −118.3952 | |
| STO | Spherical | Infinity | | 0.1343 | | | | | |
| S7 | Aspheric | 2.8838 | | 0.7584 | 1.54 | 55.80 | 0.92 | 17.6649 | |
| S8(AAS) | Aspheric | −0.5455 | −0.5453 | 0.0520 | | | | −2.8999 | −2.8995 |
| S9(AAS) | Aspheric | −23390.8042 | −1132.7972 | 0.2962 | 1.66 | 23.80 | −1.56 | 6.1956E+08 | −9.8339E+05 |
| S10 | Aspheric | 1.0231 | | 0.3002 | | | | −14.7916 | |
| S11 | Spherical | Infinity | | 0.3000 | 1.52 | 64.17 | | | |
| S12 | Spherical | Infinity | | 0.2603 | | | | | |
| S13 | Spherical | Infinity | | | | | | | |

Embodiment 5: fx = 7.16 mm, fy = 7.16 mm, ImgH = 1.19 mm, Semi-FOV = 85.3°.

TABLE 14

| Surface number | A4 | A6 | A8 | A10 | A12 |
|---|---|---|---|---|---|
| S1 | −5.2311E−02 | 1.7736E−02 | −2.9214E−03 | −3.4936E−04 | −1.8159E−05 |
| S2 | 1.3129E−01 | −9.7750E−03 | 1.8538E−03 | −2.0692E−04 | −1.2856E−05 |
| S3 | −2.8792E−02 | −1.9429E−03 | −2.6814E−04 | −2.7210E−05 | 2.3996E−06 |
| S4 | −8.9245E−02 | 4.7142E−03 | 1.3924E−03 | 7.9904E−05 | −2.2267E−06 |
| S5 | −2.0177E−02 | 5.5935E−03 | 1.0428E−03 | 6.9729E−05 | −6.0432E−06 |
| S6 | 3.4997E−03 | 1.0373E−03 | −4.0282E−05 | 7.7416E−06 | −8.1262E−07 |
| S7 | −1.3191E−02 | −8.5485E−04 | 4.5050E−05 | −3.1724E−05 | 8.9354E−07 |
| S10 | −1.2897E−01 | 4.1841E−04 | −2.2946E−04 | −1.2278E−04 | −4.9365E−06 |

| Surface number | A14 | A16 | A18 | A20 |
|---|---|---|---|---|
| S1 | −9.9900E−06 | −4.1368E−06 | 9.2882E−07 | 4.8745E−06 |
| S2 | 4.6399E−06 | 1.3997E−05 | 1.6221E−05 | 9.6911E−06 |
| S3 | 3.8126E−07 | −2.5533E−06 | −3.1491E−06 | 2.0988E−06 |
| S4 | 5.4844E−06 | 1.9464E−06 | 4.6284E−07 | −1.7099E−06 |
| S5 | 5.2240E−06 | −1.7571E−07 | −4.1024E−07 | −1.1885E−06 |
| S6 | 2.9494E−06 | −1.2002E−06 | 1.5847E−06 | −1.1991E−07 |

TABLE 14-continued

| | | | | |
|---|---|---|---|---|
| S7 | 3.5706E−07 | 2.4309E−07 | 9.3703E−08 | 4.6801E−08 |
| S10 | 9.4071E−07 | 2.3860E−06 | −3.7507E−06 | −3.0349E−06 |

TABLE 15

| AAS | AR | BR | CR | DR | ER |
|---|---|---|---|---|---|
| S8 | −3.8441E−01 | −2.8518E−01 | 1.8284E−01 | 6.5289E−03 | −1.2491E−02 |
| S9 | −4.7973E−01 | −2.6834E−01 | −5.5817E−01 | 7.0824E−02 | 4.2016E−03 |

| AAS | FR | GR | HR | JR |
|---|---|---|---|---|
| S8 | −2.7154E−02 | −6.4802E−02 | −1.5854E−01 | −3.7313E−01 |
| S9 | 1.8515E−02 | 1.7838E−02 | 5.6809E−02 | 8.4129E−02 |

| AAS | AP | BP | CP | DP | EP |
|---|---|---|---|---|---|
| S8 | −1.9071E−05 | −2.8549E−05 | −5.9484E−05 | −6.6803E−03 | 2.1854E−01 |
| S9 | 9.8008E−05 | 1.8333E−04 | 1.2862E−04 | −1.2215E−03 | 2.1854E−01 |

| AAS | FP | GP | HP | JP |
|---|---|---|---|---|
| S8 | 2.1854E−01 | 2.1854E−01 | 2.1854E−01 | 2.1854E−01 |
| S9 | 2.1854E−01 | 2.1854E−01 | 2.1854E−01 | 2.1854E−01 |

Figure 10:
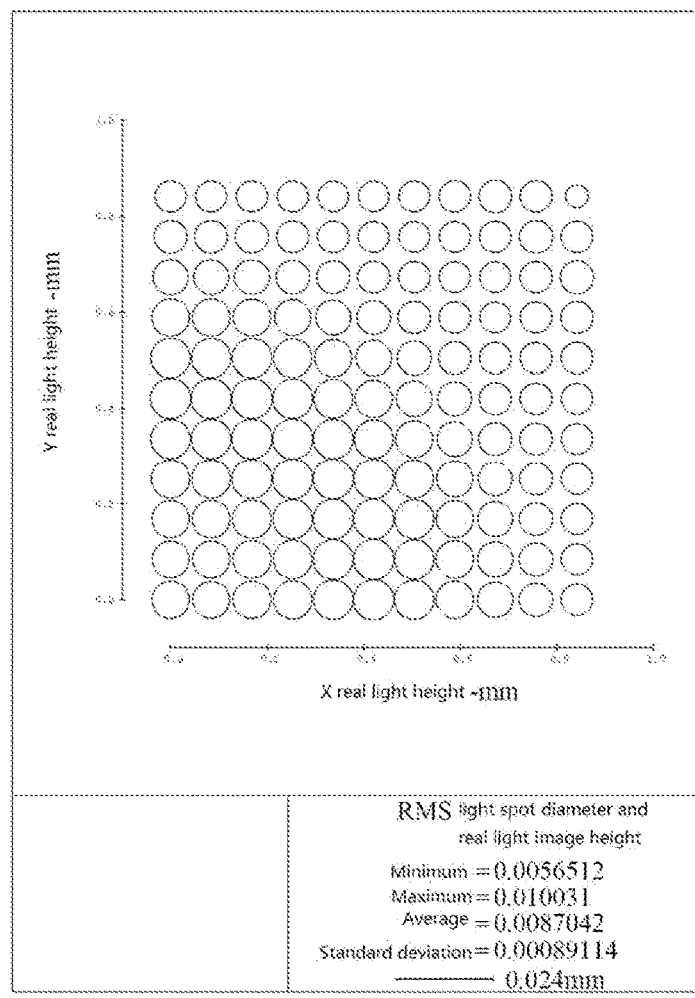
FIG. 10 schematically shows a condition of a diameter, within a first quadrant, of a RMS spot of the camera lens group of embodiment 5.

FIG. 10 shows a condition of a diameter, at different image height positions within a first quadrant, of a RMS spot of the camera lens group of embodiment 5. FIG. 10 shows that the camera lens group given in embodiment 5 is capable of achieving good imaging quality.

Embodiment 6

Figure 11:
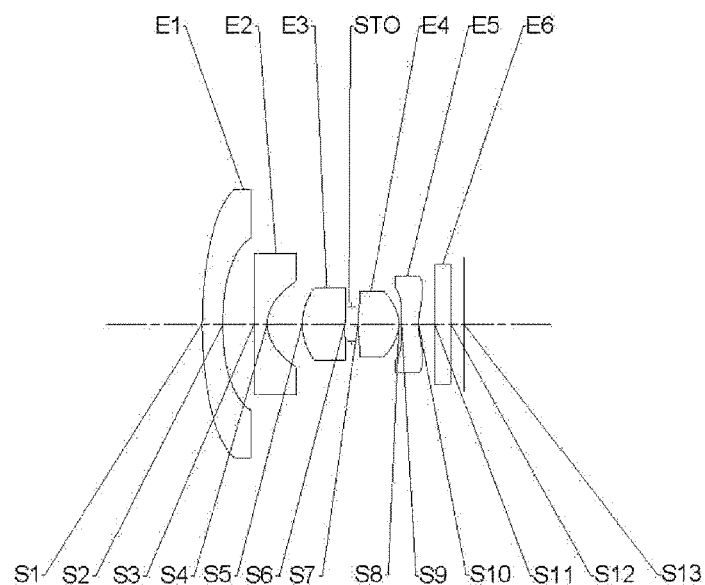
FIG. 11 shows a structural schematic diagram of a camera lens group according to embodiment 6 of the disclosure.

A camera lens group according to embodiment 6 of the disclosure is described below with reference to FIGS. 11 and 12. FIG. 11 shows a structural schematic diagram of a camera lens group according to embodiment 6 of the disclosure.

As shown in FIG. 11, the camera lens group sequentially includes, from an object side to an image side along an optical axis: a first lens E1, a second lens E2, a third lens E3, a diaphragm STO, a fourth lens E4, a fifth lens E5, an optical filter E6 and an imaging surface S13.

The first lens E1 has a negative refractive power, an object-side surface S1 thereof is convex surface, and an image-side surface S2 thereof is concave surface. The second lens E2 has a negative refractive power, an object-side surface S3 thereof is convex surface, and an image-side surface S4 thereof is concave surface. The third lens E3 has a positive refractive power, an object-side surface S5 thereof is convex surface, and an image-side surface S6 thereof is concave surface. The fourth lens E4 has a positive refractive power, an object-side surface S7 thereof is convex surface, and an image-side surface S8 thereof is convex surface. The fifth lens E5 has a negative refractive power, an object-side surface S9 thereof is convex surface, and an image-side surface S10 thereof is concave surface. The optical filter E7 has an object-side surface S11 and an image-side surface S12. Light from an object sequentially passes through each of the faces S1 to S12 and is finally imaged on the imaging surface S13.

Table 16 shows a table of basic parameters for the camera lens group of embodiment 6, in which the curvature radius Y, the curvature radius X, the thickness, and the focal length are each in millimeters (mm). Table 17 shows higher order term coefficients that may be used for each aspheric mirror face in embodiment 6, wherein each aspheric surface type may be defined by formula (1) given in embodiment 1 above. Table 18 shows higher order coefficients of rotational symmetry components and non-rotational symmetry components which may be used for the aspheric surfaces S8 which is in non-rotational symmetry, in embodiment 6, wherein the non-rotational symmetry aspheric surface type may be defined by formula (2) given in embodiment 1 above.

TABLE 16

Embodiment 6: fx = 12.39 mm, fy = 12.23 mm, ImgH = 1.21 mm, Semi-FOV = 86.4°.

| | | | | | Material | | | Conic | Conic |
|---|---|---|---|---|---|---|---|---|---|
| Surface number | Surface type | Curvature radius Y | Curvature radius X | Thickness | Refractive index | Abbe number | Focal length | coefficient Y | coefficient X |
| OBJ | Spherical | Infinity | | Infinity | | | | | |
| S1 | Aspheric | 7.2977 | | 0.3743 | 1.54 | 55.80 | −40.32 | 7.1867 | |
| S2 | Aspheric | 5.3742 | | 0.5718 | | | | 10.4415 | |
| S3 | Aspheric | 33.6177 | | 0.2350 | 1.54 | 55.80 | −1.11 | 6.5247 | |
| S4 | Aspheric | 0.5930 | | 0.6268 | | | | −0.7234 | |
| S5 | Aspheric | 1.0043 | | 0.7782 | 1.66 | 23.80 | 1.54 | −0.1930 | |
| S6 | Aspheric | 89.0238 | | 0.1134 | | | | 99.0000 | |
| STO | Spherical | Infinity | | 0.1273 | | | | | |

TABLE 16-continued

Embodiment 6: fx = 12.39 mm, fy = 12.23 mm, ImgH = 1.21 mm, Semi-FOV = 86.4°.

| Surface number | Surface type | Curvature radius Y | Curvature radius X | Thickness | Material Refractive index | Abbe number | Focal length | Conic coefficient Y | Conic coefficient X |
|---|---|---|---|---|---|---|---|---|---|
| S7 | Aspheric | 2.4391 | | 0.7432 | 1.54 | 55.80 | 0.90 | 15.7769 | |
| S8(AAS) | Aspheric | −0.5491 | −0.5405 | 0.0461 | | | | −2.8502 | −3.0765 |
| S9 | Aspheric | 48.8897 | | 0.3098 | 1.66 | 23.80 | −1.54 | 55.6042 | |
| S10 | Aspheric | 0.9886 | | 0.2948 | | | | −14.9728 | |
| S11 | Spherical | Infinity | | 0.3000 | 1.52 | 64.17 | | | |
| S12 | Spherical | Infinity | | 0.2549 | | | | | |
| S13 | Spherical | Infinity | | | | | | | |

TABLE 17

| Surface number | A4 | A6 | A8 | A10 | A12 |
|---|---|---|---|---|---|
| S1 | −4.9951E−02 | 1.9128E−02 | −2.7023E−03 | −1.0202E−03 | −2.2483E−04 |
| S2 | 1.3375E−01 | −1.0193E−02 | 1.7817E−03 | −7.3843E−04 | −3.4646E−04 |
| S3 | −2.6793E−02 | −1.3069E−03 | −1.7302E−04 | −2.4079E−05 | −1.9514E−04 |
| S4 | −9.0859E−02 | 4.0759E−03 | 1.5546E−03 | −1.2795E−04 | 1.1464E−04 |
| S5 | −2.2014E−02 | 5.3164E−03 | 8.3315E−04 | 1.4569E−04 | −8.3619E−06 |
| S6 | 6.0714E−03 | 1.2236E−03 | −2.3657E−04 | 1.1145E−04 | −7.9127E−05 |
| S7 | −1.4539E−02 | −1.0267E−03 | 1.9437E−04 | −7.7144E−05 | 3.0688E−05 |
| S9 | −1.0857E−01 | −6.0875E−03 | −3.1931E−04 | 4.2058E−05 | 1.8265E−05 |
| S10 | −1.4085E−01 | −1.6953E−03 | −7.6279E−04 | −2.0773E−04 | −8.7554E−05 |

| Surface number | A14 | A16 | A18 | A20 |
|---|---|---|---|---|
| S1 | −3.4861E−05 | 2.4449E−05 | 5.1547E−05 | −2.8495E−05 |
| S2 | −2.3888E−04 | −2.7053E−05 | 3.1871E−05 | 1.4227E−04 |
| S3 | −6.6312E−05 | −5.1654E−05 | 3.1323E−05 | −1.7889E−05 |
| S4 | 2.1964E−05 | 8.6569E−05 | 2.6594E−05 | 4.2661E−05 |
| S5 | 7.9233E−05 | −1.1672E−05 | 1.1187E−05 | −1.9846E−05 |
| S6 | 5.5329E−05 | −6.0828E−06 | 2.7959E−05 | −1.5731E−05 |
| S7 | −3.8918E−05 | 1.0147E−05 | −1.0551E−05 | 6.1431E−06 |
| S9 | −4.7228E−05 | 2.4173E−05 | −2.3959E−05 | 1.6476E−06 |
| S10 | −6.2074E−05 | 5.7142E−05 | −1.7082E−05 | −2.6287E−06 |

TABLE 18

| AAS | AR | BR | CR | DR | ER | FR | GR | HR | JR |
|---|---|---|---|---|---|---|---|---|---|
| S8 | −3.8159E−01 | −2.8791E−01 | 1.6571E−01 | 1.8339E−02 | −1.2170E−03 | 6.0064E−02 | 8.2768E−01 | 7.4677E−02 | 6.6794E−02 |

| AAS | AP | BP | CP | DP | EP | FP | GP | HP | JP |
|---|---|---|---|---|---|---|---|---|---|
| S8 | −2.6844E−02 | −2.5029E−02 | −7.6462E−02 | 1.6493E−01 | 2.3412E+00 | 6.9439E−01 | −2.6996E−01 | 8.7644E−01 | −5.3641E−01 |

Figure 12:
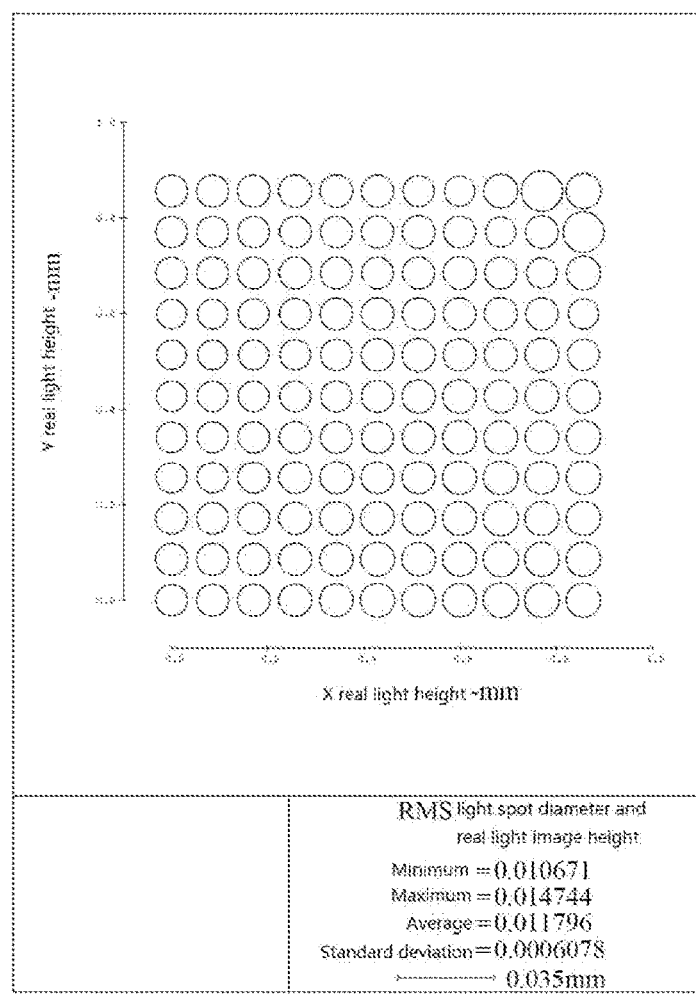
FIG. 12 schematically shows a condition of a diameter, within a first quadrant, of a RMS spot of the camera lens group of embodiment 6.

FIG. 12 shows a condition of a diameter, at different image height positions within a first quadrant, of a RMS spot of the camera lens group of embodiment 6. FIG. 12 shows that the camera lens group given in embodiment 6 is capable of achieving good imaging quality.

Embodiment 7

Figure 13:
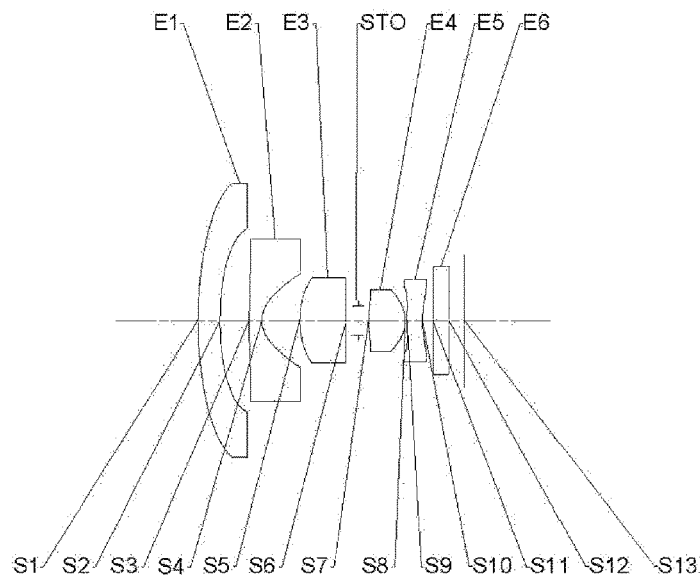
FIG. 13 shows a structural schematic diagram of a camera lens group according to embodiment 7 of the disclosure.

A camera lens group according to embodiment 7 of the disclosure is described below with reference to FIGS. 13 and 14. FIG. 13 shows a structural schematic diagram of a camera lens group according to embodiment 7 of the disclosure.

As shown in FIG. 13, the camera lens group sequentially includes, from an object side to an image side along an optical axis: a first lens E1, a second lens E2, a third lens E3, a diaphragm STO, a fourth lens E4, a fifth lens E5, an optical filter E6 and an imaging surface S13.

The first lens E1 has a negative refractive power, an object-side surface S1 thereof is convex surface, and an image-side surface S2 thereof is concave surface. The second lens E2 has a negative refractive power, an object-side surface S3 thereof is convex surface, and an image-side surface S4 thereof is concave surface. The third lens E3 has a positive refractive power, an object-side surface S5 thereof is convex surface, and an image-side surface S6 thereof is convex surface. The fourth lens E4 has a positive refractive power, an object-side surface S7 thereof is convex surface, and an image-side surface S8 thereof is convex surface. The fifth lens E5 has a negative refractive power, an object-side surface S9 thereof is convex surface, and an image-side surface S10 thereof is concave surface. The optical filter E7 has an object-side surface S11 and an image-side surface S12. Light from an object sequentially passes through each of the faces S1 to S12 and is finally imaged on the imaging surface S13.

Table 19 shows a table of basic parameters for the camera lens group of embodiment 7, in which the curvature radius Y, the curvature radius X, the thickness, and the focal length are each in millimeters (mm). Table 20 shows higher order term coefficients that may be used for each aspheric mirror face in embodiment 7, wherein each aspheric surface type may be defined by formula (1) given in embodiment 1 above. Table 21 shows higher order coefficients of rotational symmetry components and non-rotational symmetry components which may be used for the aspheric surfaces S7 which is in non-rotational symmetry, in embodiment 7, wherein the non-rotational symmetry aspheric surface type may be defined by formula (2) given in embodiment 1 above.

TABLE 19

Embodiment 7: $fx = 0.22$ mm, $fy = 0.22$ mm, ImgH = 1.24 mm, Semi-FOV = 85.1°.

| Surface number | Surface type | Curvature radius Y | Curvature radius X | Thickness | Material Refractive index | Abbe number | Focal length | Conic coefficient Y | Conic coefficient X |
|---|---|---|---|---|---|---|---|---|---|
| OBJ | Spherical | Infinity | | Infinity | | | | | |
| S1 | Aspheric | 7.3752 | | 0.4128 | 1.54 | 55.80 | −40.85 | 6.6807 | |
| S2 | Aspheric | 5.4140 | | 0.5400 | | | | 8.6231 | |
| S3 | Aspheric | 16.8358 | | 0.2350 | 1.54 | 55.80 | −0.93 | −30.6244 | |
| S4 | Aspheric | 0.4854 | | 0.6938 | | | | −0.8600 | |
| S5 | Aspheric | 1.5071 | | 0.8630 | 1.66 | 23.80 | 1.79 | 0.2468 | |
| S6 | Aspheric | −3.8063 | | 0.2323 | | | | −131.7585 | |
| STO | Spherical | Infinity | | 0.1881 | | | | | |
| S7(AAS) | Aspheric | 2.1534 | 2.1540 | 0.6791 | 1.54 | 55.80 | 0.91 | 10.8517 | 10.8502 |
| S8 | Aspheric | −0.5603 | | 0.0300 | | | | −2.6229 | |
| S9 | Aspheric | 5.4905 | | 0.2835 | 1.66 | 23.80 | −3.89 | 58.6260 | |
| S10 | Aspheric | 1.6857 | | 0.2000 | | | | −3.4065 | |
| S11 | Spherical | Infinity | | 0.3000 | 1.52 | 64.17 | | | |
| S12 | Spherical | Infinity | | 0.2948 | | | | | |
| S13 | Spherical | Infinity | | | | | | | |

TABLE 20

| Surface number | A4 | A6 | A8 | A10 | A12 |
|---|---|---|---|---|---|
| S1 | −3.7896E−02 | 8.8523E−03 | −2.1315E−03 | 2.7314E−04 | 1.0353E−04 |
| S2 | 5.4421E−02 | 2.1370E−02 | 8.8289E−03 | 4.4500E−03 | 2.3003E−04 |
| S3 | −2.5835E−02 | −2.5465E−03 | −4.9248E−04 | −1.4737E−04 | −4.1645E−05 |
| S4 | −1.6170E−01 | 3.7644E−03 | 1.5637E−03 | 4.8677E−04 | 6.2190E−05 |
| S5 | −5.0494E−03 | 1.6415E−02 | 2.1784E−03 | 2.5902E−04 | 1.4967E−04 |
| S6 | 1.0698E−02 | 2.6963E−03 | 1.8664E−04 | 1.6458E−04 | 2.5341E−05 |
| S8 | −1.1757E−01 | 2.8557E−04 | −9.7926E−04 | −1.0459E−03 | 1.7726E−04 |
| S9 | −1.6094E−01 | −1.3135E−02 | 1.1216E−03 | −1.7440E−03 | −1.2988E−03 |
| S10 | −1.0049E−01 | 4.1120E−03 | 5.4496E−03 | −9.1022E−04 | −9.7151E−04 |

| Surface number | A14 | A16 | A18 | A20 |
|---|---|---|---|---|
| S1 | −5.4674E−05 | −9.4421E−05 | −9.9438E−05 | 1.2453E−04 |
| S2 | 6.4438E−04 | −4.7504E−04 | 1.9848E−04 | −2.3898E−04 |
| S3 | 8.1500E−05 | 2.5738E−05 | −4.7324E−05 | 9.7206E−06 |
| S4 | −1.9295E−05 | −3.8858E−05 | 6.8670E−05 | −3.7155E−05 |
| S5 | −7.7016E−05 | 1.3309E−05 | −5.9346E−05 | 1.8152E−05 |
| S6 | 2.5311E−05 | 3.0343E−05 | 1.0954E−05 | 9.8037E−06 |
| S8 | 5.8394E−04 | 2.1770E−04 | 1.3480E−04 | 1.1749E−04 |
| S9 | 2.9943E−04 | −2.7409E−04 | −1.4915E−04 | −7.4722E−05 |
| S10 | 3.0648E−04 | −3.5388E−04 | −1.2067E−04 | 5.8977E−07 |

TABLE 21

| AAS | AR | BR | CR | DR | ER |
|---|---|---|---|---|---|
| S7 | −2.4174E−01 | −2.7165E+00 | 4.9591E+01 | −6.6297E+02 | 5.8136E+03 |

| AAS | FR | GR | HR | JR |
|---|---|---|---|---|
| S7 | −3.2039E+04 | 1.0525E+05 | −1.8722E+05 | 1.3745E+05 |

TABLE 21-continued

| AAS | AP | BP | CP | DP | EP |
|---|---|---|---|---|---|
| S7 | −9.9113E−05 | 4.0813E−05 | −8.3282E−05 | −2.2624E−06 | 2.8336E−06 |

| AAS | FP | GP | HP | JP |
|---|---|---|---|---|
| S7 | −7.9316E−06 | −5.1728E−06 | −1.6378E−06 | −1.8004E−05 |

Figure 14:
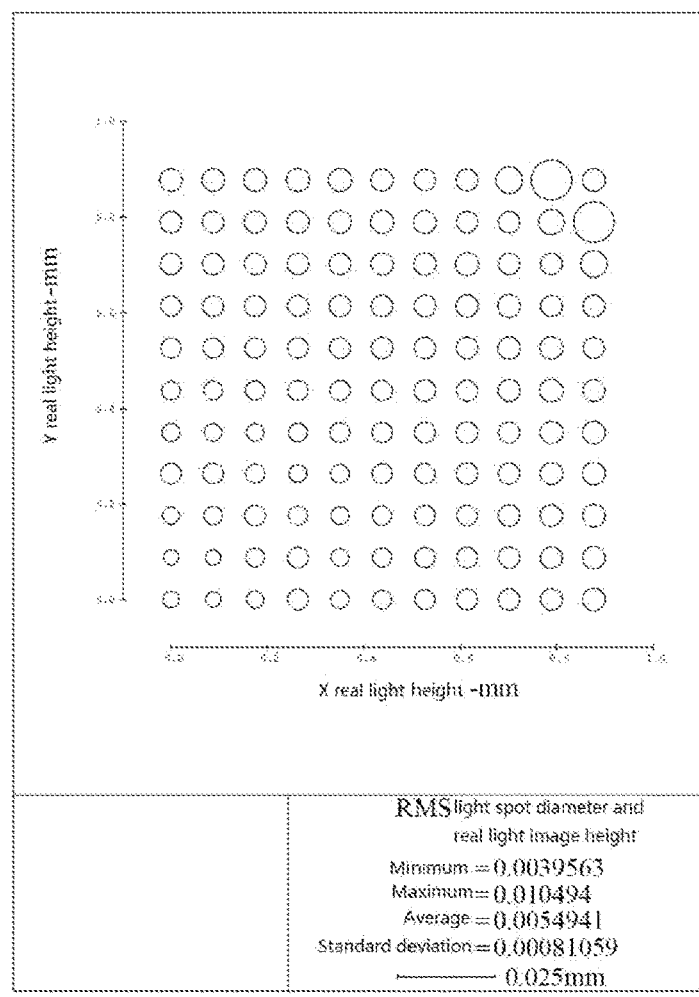
FIG. 14 schematically shows a condition of a diameter, within a first quadrant, of a RMS spot of the camera lens group of embodiment 7.

FIG. 14 shows a condition of a diameter, at different image height positions within a first quadrant, of a RMS spot of the camera lens group of embodiment 7. FIG. 14 shows that the camera lens group given in embodiment 7 is capable of achieving good imaging quality.

To summarize, embodiments 1-7 separately satisfy relationships shown in Table 22.

TABLE 22

| Conditional expression | embodiments | | | | | | |
|---|---|---|---|---|---|---|---|
| | 1 | 2 | 3 | 4 | 5 | 6 | 7 |
| fx/fy | 1.20 | 1.06 | 1.00 | 1.06 | 1.00 | 1.01 | 1.00 |
| Semi-FOV (°) | 84.0 | 86.0 | 86.5 | 85.9 | 85.3 | 86.4 | 85.1 |
| TTL/ImgH | 4.13 | 4.03 | 4.01 | 4.01 | 4.05 | 3.93 | 3.99 |
| R1/R2 | 1.36 | 1.36 | 1.36 | 0.96 | 1.35 | 1.36 | 1.36 |
| T23/T34 | 1.84 | 2.45 | 2.41 | 2.36 | 2.62 | 2.60 | 1.65 |
| R7/R10 | 3.50 | 2.83 | 2.85 | 2.74 | 2.82 | 2.47 | 1.28 |
| CT3 * 10/TTL | 1.76 | 1.67 | 1.66 | 1.70 | 1.59 | 1.64 | 1.75 |
| SAG41 *100/SAG42 | −6.55 | −8.60 | −8.60 | −9.50 | −8.19 | −12.06 | −13.46 |
| ΣAT/TD | 0.38 | 0.37 | 0.37 | 0.37 | 0.37 | 0.38 | 0.41 |
| f3/f4 | 1.99 | 1.70 | 1.68 | 1.72 | 1.67 | 1.70 | 1.98 |
| T45 *100/ImgH | 3.15 | 4.28 | 4.16 | 3.89 | 4.37 | 3.81 | 2.42 |
| R7/f4 | 3.42 | 3.15 | 3.05 | 3.03 | 3.15 | 2.70 | 2.38 |
| CT3/T34 | 2.61 | 3.17 | 3.10 | 3.13 | 3.20 | 3.23 | 2.05 |
| CT1/CT2 | 1.69 | 1.52 | 1.46 | 1.51 | 1.39 | 1.59 | 1.76 |

The disclosure further provides a photographing device, and an electronic photosensitive element thereof may be a charge coupled device (CCD) or a complementary metal-oxide-semiconductor (CMOS). The photographing device may be a standalone photographing apparatus, for example, a digital camera, or may be a photographing module integrated on a mobile electronic apparatus, for example, a cell phone. The photographing device is equipped with the camera lens group described above.

The above description is merely illustrative of preferred embodiments of the present application and of principles of the technology employed. It should be understood by those skilled in the art that the scope of the invention referred to in this application is not limited to the technical solutions in which the above-described technical features are specifically combined, but also encompasses other technical solutions in which the above-described technical features or equivalent features thereof are arbitrarily combined without departing from the inventive concept, for example, technical solutions formed by interchanging the features described above with (but not limited to) technical features disclosed in this application that have similar functions.

What is claimed is:

1. A camera lens group, sequentially comprising, from an object side to an image side along an optical axis:
    a first lens with a refractive power,
    a second lens with a negative refractive power and an image-side surface thereof being concave,
    a third lens with a positive refractive power,
    a fourth lens with a positive refractive power and an image-side surface thereof being convex, and
    a fifth lens with a negative refractive power,
    wherein an air space is provided between any two adjacent lenses from the first lens to the fifth lens, and at least one lens from the first lens to the fifth lens is provided with an aspheric surface which is in non-rotational symmetry; and
    an effective focal length fx, in an X-axis direction, of the camera lens group and an effective focal length fy, in a Y-axis direction, of the camera lens group satisfy 0.90<fx/fy<1.25.

2. The camera lens group according to claim 1, wherein Semi-FOV is a half of a maximum field of view of the camera lens group, Semi-FOV satisfies Semi-FOV>83.5°.

3. The camera lens group according to claim 1, wherein a curvature radius R1 of an object-side surface of the first lens and a curvature radius R2 of an image-side surface of the first lens satisfy 0.50<R1/R2<1.50.

4. The camera lens group according to claim 1, wherein a spacing distance T23, on the optical axis, between the second lens and the third lens and a spacing distance T34, on the optical axis, between the third lens and the fourth lens satisfy 1.50<T23/T34<3.00.

5. The camera lens group according to claim 1, wherein a curvature radius R7 of an object-side surface of the fourth lens and a curvature radius R10 of an image-side surface of the fifth lens satisfy 1.00<R7/R10<3.60.

6. The camera lens group according to claim 1, wherein a center thickness CT3, on the optical axis, of the third lens and a distance TTL, on the optical axis, from an object-side surface of the first lens to an imaging surface of the camera lens group satisfy 1.50<CT3*10/TTL<2.00.

7. The camera lens group according to claim 1, wherein an on-axis distance SAG41 from an intersection point of an object-side surface of the fourth lens and the optical axis to an effective radius vertex of the object-side surface of the fourth lens and an on-axis distance SAG42 from an intersection point of an image-side surface of the fourth lens and the optical axis to an effective radius vertex of the image-side surface of the fourth lens satisfy −13.50<SAG41*100/SAG42<−6.50.

8. The camera lens group according to claim 1, wherein an effective focal length f3 of the third lens and an effective focal length f4 of the fourth lens satisfy 1.50<f3/f4<2.50.

9. The camera lens group according to claim 1, wherein ImgH is a half of a diagonal length of an effective pixel region on the imaging surface of the camera lens group, a spacing distance T45, on the optical axis, between the fourth lens and the fifth lens and ImgH satisfy 2.00<T45*100/ImgH<4.50.

10. The camera lens group according to claim 1, wherein a curvature radius R7 of an object-side surface of the fourth lens and an effective focal length f4 of the fourth lens satisfy 2.00<R7/f4<4.00.

11. The camera lens group according to claim 1, wherein a center thickness CT3, on the optical axis, of the third lens and a spacing distance T34, on the optical axis, between the third lens and the fourth lens satisfy 2.00<CT3/T34<3.50.

12. The camera lens group according to claim 1, wherein a center thickness CT1, on the optical axis, of the first lens and a center thickness CT2, on the optical axis, of the second lens satisfy 1.00<CT1/CT2<2.00.

13. The camera lens group according to claim 1, wherein ImgH is a half of a diagonal length of an effective pixel region on the imaging surface of the camera lens group, a distance TTL, on the optical axis, from an object-side surface of the first lens to an imaging surface of the camera lens group and ImgH satisfy 3.50<TTL/ImgH<4.20.

14. The camera lens group according to claim 1, wherein a sum ΣAT of spacing distances, on the optical axis, between any two adjacent lenses from the first lens to the fifth lens and a distance TD, on the optical axis, from an object-side surface of the first lens to an image-side surface of the fifth lens satisfy ΣAT/TD<0.42.

15. A camera lens group, sequentially comprising, from an object side to an image side along an optical axis:
   a first lens with a refractive power,
   a second lens with a negative refractive power and an image-side surface thereof being concave,
   a third lens with a positive refractive power,
   a fourth lens with a positive refractive power and an image-side surface thereof being convex, and
   a fifth lens with a negative refractive power,
   wherein at least one lens from the first lens to the fifth lens is provided with an aspheric surface which is in non-rotational symmetry; and Semi-FOV is a half of a maximum field of view of the camera lens group, Semi-FOV satisfies Semi-FOV>83.5°; and
an effective focal length fx, in an X-axis direction, of the camera lens grout and an effective focal length fy, in a Y-axis direction, of the camera lens group satisfy 0.90<fx/fy<1.25.

16. The camera lens group according to claim 15, wherein an effective focal length f3 of the third lens and an effective focal length f4 of the fourth lens satisfy 1.50<f3/f4<2.50.

17. The camera lens group according to claim 16, wherein a curvature radius R7 of an object-side surface of the fourth lens and an effective focal length f4 of the fourth lens satisfy 2.00<R7/f4<4.00.

18. The camera lens group according to claim 15, wherein a curvature radius R1 of an object-side surface of the first lens and a curvature radius R2 of an image-side surface of the first lens satisfy 0.50<R1/R2<1.50.

19. The camera lens group according to claim 15, wherein a center thickness CT3, on the optical axis, of the third lens and a distance TTL, on the optical axis, from an object-side surface of the first lens to an imaging surface of the camera lens group satisfy 1.50<CT3 10/TTL<2.00.

20. The camera lens group according to claim 19, wherein a center thickness CT3, on the optical axis, of the third lens and a spacing distance T34, on the optical axis, between the third lens and the fourth lens satisfy 2.00<CT3/T34<3.50.

* * * * *